United States Patent
Faulkner et al.

(10) Patent No.: US 10,917,608 B1
(45) Date of Patent: Feb. 9, 2021

(54) DYNAMICALLY CONTROLLED ASPECT RATIOS BASED ON A NUMBER OF PARTICIPANTS DEPICTED IN COMMUNICATION VIDEO STREAMS

(71) Applicant: MICROSOFT TECHNOLOGY LICENSING, LLC, Redmond, WA (US)

(72) Inventors: Jason Thomas Faulkner, Seattle, WA (US); Ruchir Astavans, Redmond, WA (US); Kevin Daniel Morrison, Arlington, MA (US); Timur Aleshin, Redmond, WA (US); Chad A. Voss, Redmond, WA (US); Amey Parandekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/729,286

(22) Filed: Dec. 27, 2019

(51) Int. Cl.
| | | |
|---|---|---|
| *H04N 7/01* | (2006.01) | |
| *H04N 7/15* | (2006.01) | |
| *G06K 9/00* | (2006.01) | |
| *H04N 21/47* | (2011.01) | |
| *H04N 21/431* | (2011.01) | |

(52) U.S. Cl.
CPC ....... *H04N 7/0122* (2013.01); *G06K 9/00718* (2013.01); *H04N 7/15* (2013.01); *H04N 21/4316* (2013.01); *H04N 21/47* (2013.01)

(58) Field of Classification Search
CPC ............ H04N 7/01; H04N 7/15; H04N 5/445; G06K 9/00
USPC .......................................... 348/14.01–14.16
See application file for complete search history.

(56) References Cited

U.S. PATENT DOCUMENTS

| | | |
|---|---|---|
| 7,554,571 B1 | 6/2009 | Beck et al. |
| 8,350,891 B2 | 1/2013 | Khot et al. |
| 8,379,077 B2 | 2/2013 | Wu et al. |
| 9,088,694 B2 | 7/2015 | Navon et al. |

(Continued)

OTHER PUBLICATIONS

"About Sync Settings on Windows 10 devices", Retrieved from: https://web.archive.org/web/20190906210836/https:/support.microsoft.com/en-us/help/4026102/windows-10-about-sync-settings, Retrieved Date: Sep. 6, 2019, 2 Pages.

(Continued)

*Primary Examiner* — Melur Ramakrishnaiah
(74) *Attorney, Agent, or Firm* — Newport IP, LLC; Scott Y. Shigeta

(57) ABSTRACT

The disclosed techniques improve user engagement and more efficient use of computing resources by providing dynamically controlled aspect ratios for communication session renderings based on a number of people depicted in shared video streams. A system can identify select streams depicting at least a threshold number of individuals. A first aspect ratio can be selected from a number of preset aspect ratios for the display of select streams depicting at least the threshold number of individuals. A second aspect ratio can be selected for the display of other individual streams having video components depicting less than the threshold number of individuals. In some embodiments, the first aspect ratio is greater than the second aspect ratio. By switching between aspect ratios depending on a number of individuals depicted in each video stream, a system can improve user engagement by equalizing the display each person participating in a communication session.

20 Claims, 15 Drawing Sheets

(56) References Cited

U.S. PATENT DOCUMENTS

| | | |
|---|---|---|
| 9,148,627 B2 | 9/2015 | Anderson et al. |
| 9,369,672 B2 | 6/2016 | Hiller et al. |
| 9,467,657 B2 | 10/2016 | Decker et al. |
| 9,736,395 B2 | 8/2017 | Ramon |
| 9,781,385 B2 | 10/2017 | Ma et al. |
| 9,800,831 B2 | 10/2017 | Diao |
| 9,876,989 B2 | 1/2018 | Noy et al. |
| 10,321,093 B2 | 6/2019 | Duckworth et al. |
| 10,362,272 B1 | 7/2019 | Van et al. |
| 2007/0300165 A1 | 12/2007 | Haveliwala |
| 2011/0249074 A1 | 10/2011 | Cranfill et al. |
| 2012/0062473 A1 | 3/2012 | Xiao et al. |
| 2012/0249877 A1* | 10/2012 | Hernandez Costa ......... H04N 21/4316 348/564 |
| 2016/0308920 A1 | 10/2016 | Brunsch et al. |
| 2018/0014049 A1 | 1/2018 | Griffin et al. |
| 2018/0152737 A1* | 5/2018 | Mathur ................ H04N 21/234 |
| 2018/0191965 A1 | 7/2018 | Faulkner et al. |
| 2019/0342519 A1* | 11/2019 | Van Os ................. G06F 9/542 |

OTHER PUBLICATIONS

"Changing Your Own Video Layout", Retrieved from: https://documentation.avaya.com/bundle/UsingXTSeries_r91/page/xt1000_ug_calls_changeVideoLayout.html, Retrieved Date: Sep. 17, 2019, 4 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Sep. 17, 2019, 3 Pages.

"ViewSplit—Display Layout Software", Retrieved from: https://web.archive.org/web/20170318042724/https:/www.viewsonic.com/us/viewsplit.html, Retrieved Date: Mar. 18, 2017, 4 Pages.

"Non-Final Office Action Issued in U.S. Appl. No. 16/729,255", dated Mar. 20, 2020, 10 Pages.

"Non-Final Office Action Issued in U.S. Appl. No. 16/729,272", dated Mar. 20, 2020, 8 Pages.

"Final Office Action Issued in U.S. Appl. No. 16/729,272", dated Oct. 8, 2020, 8 Pages.

\* cited by examiner

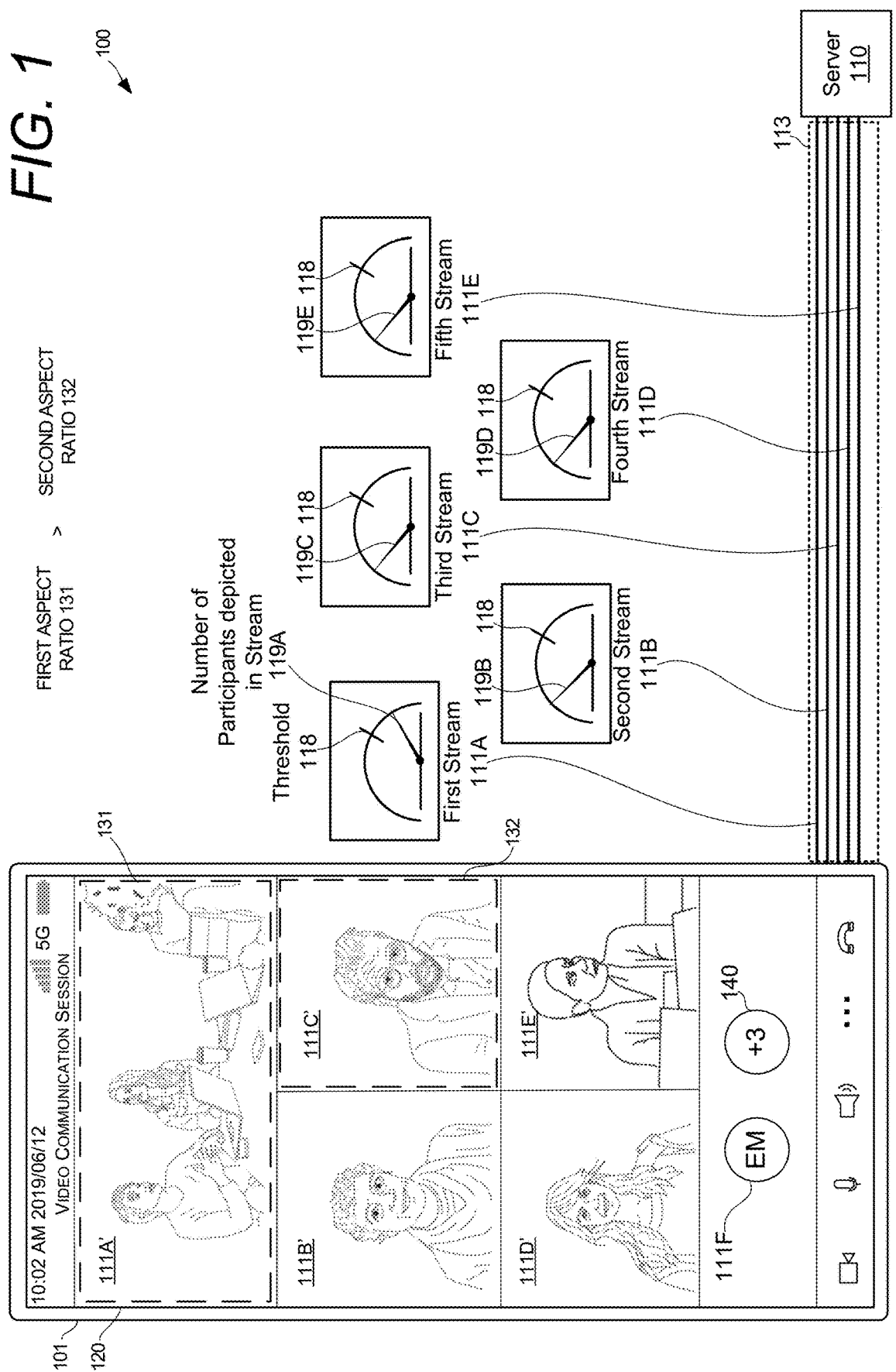

FIG. 2A
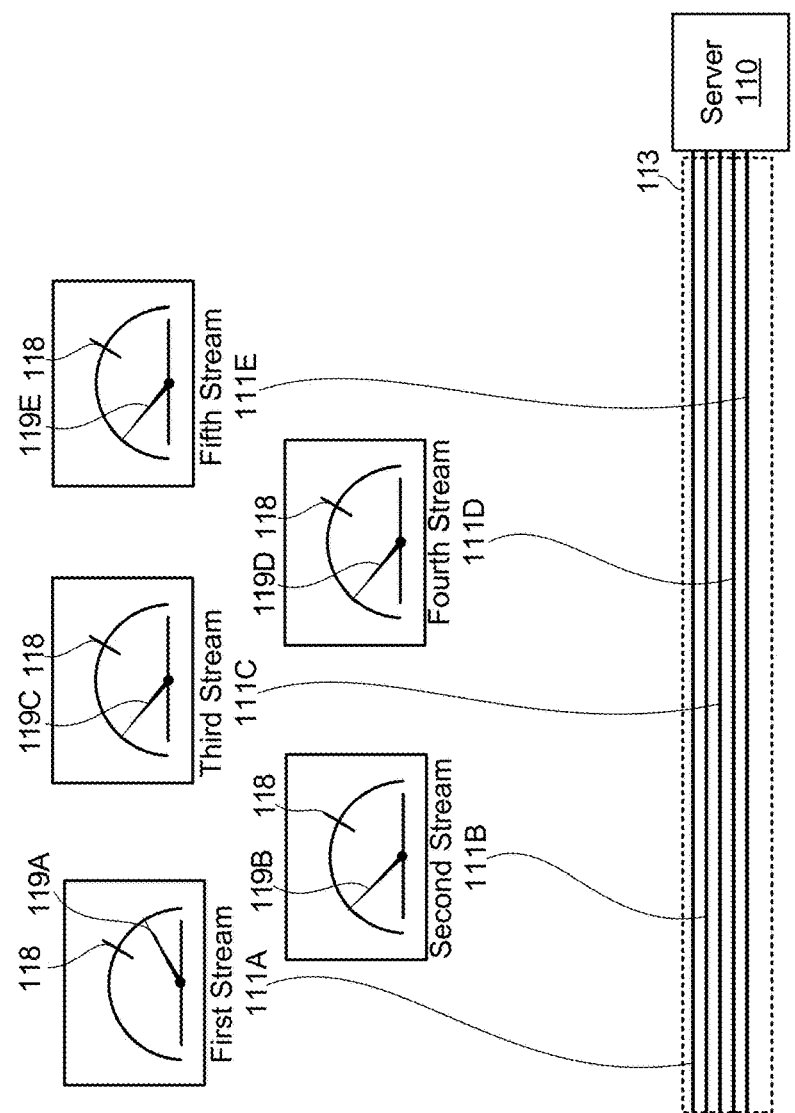
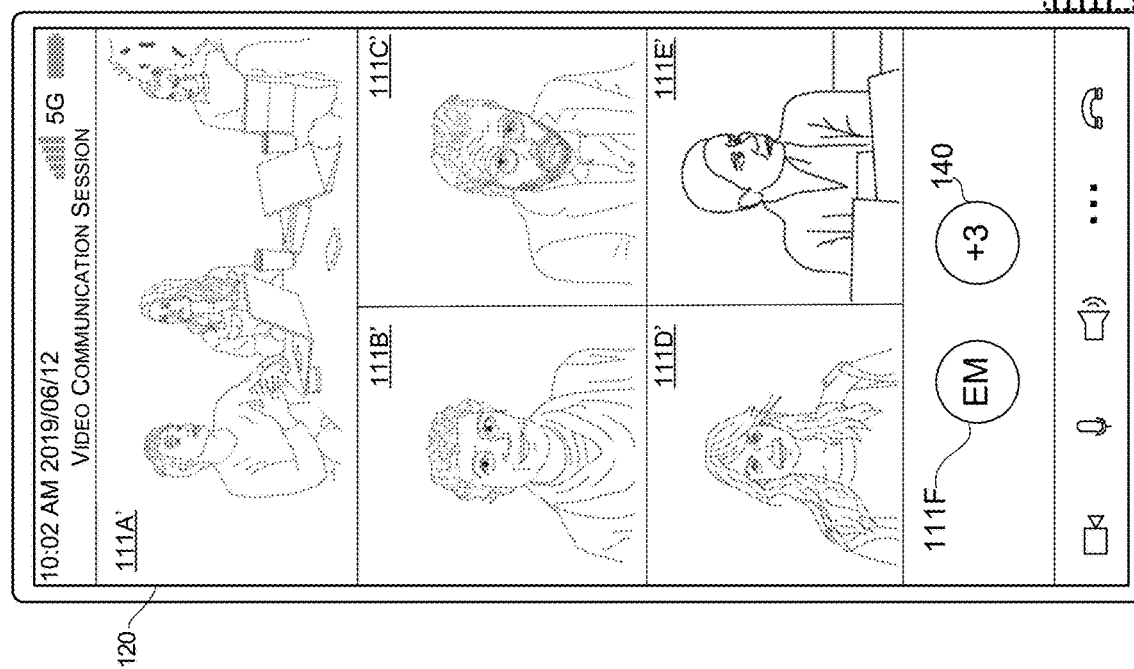

FIG. 2B
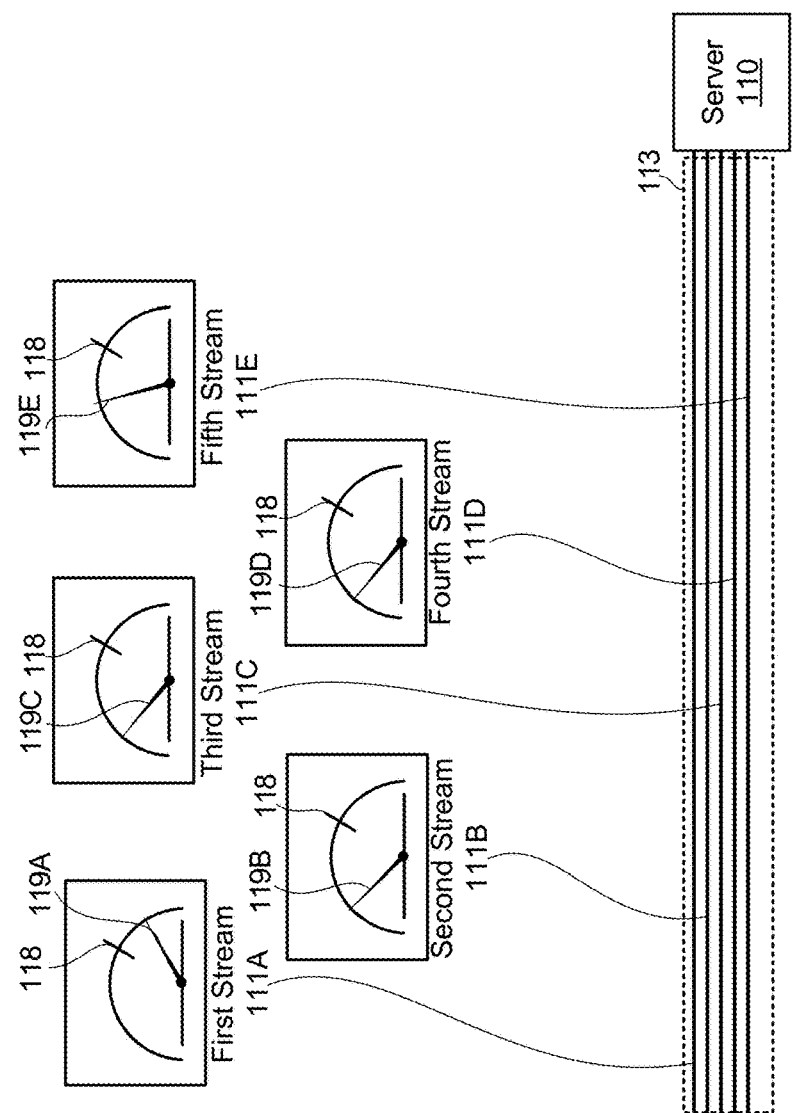
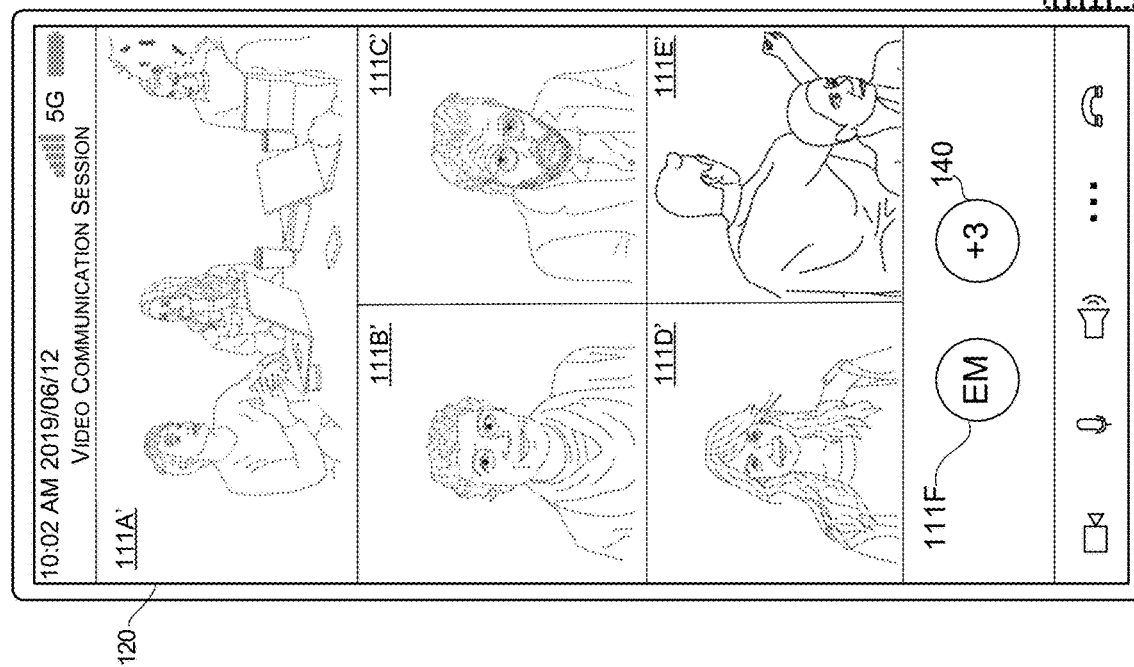

FIG. 2C
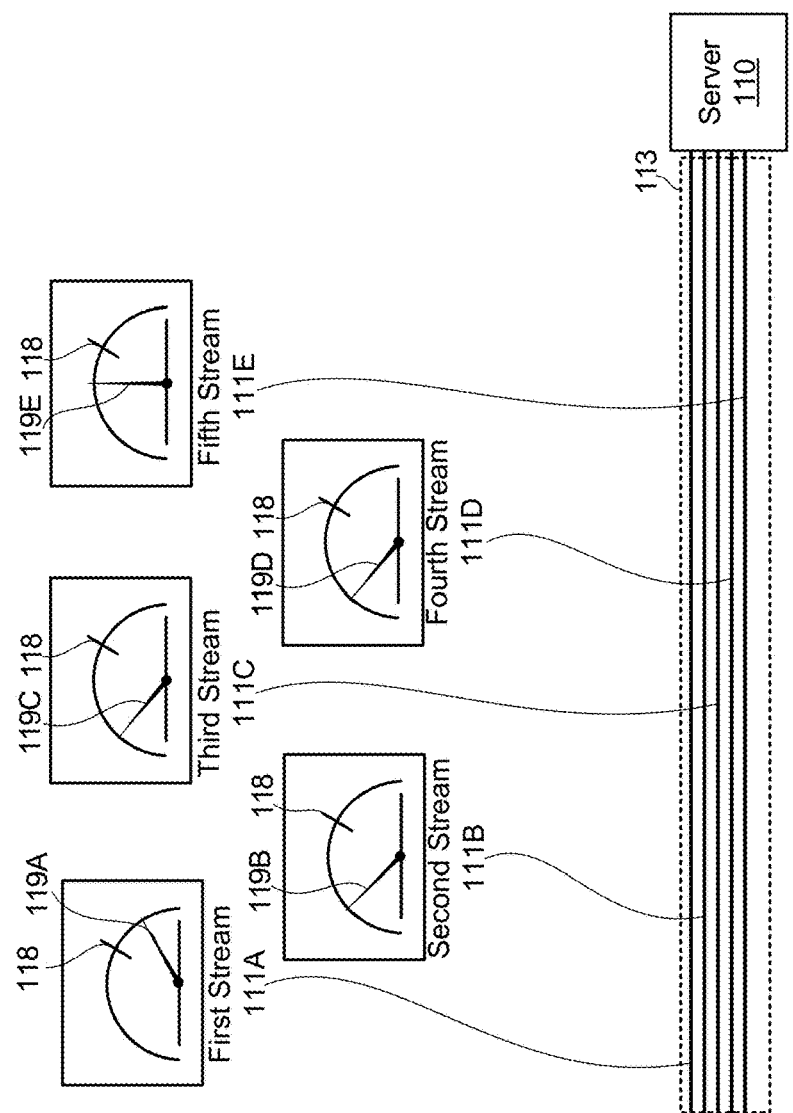
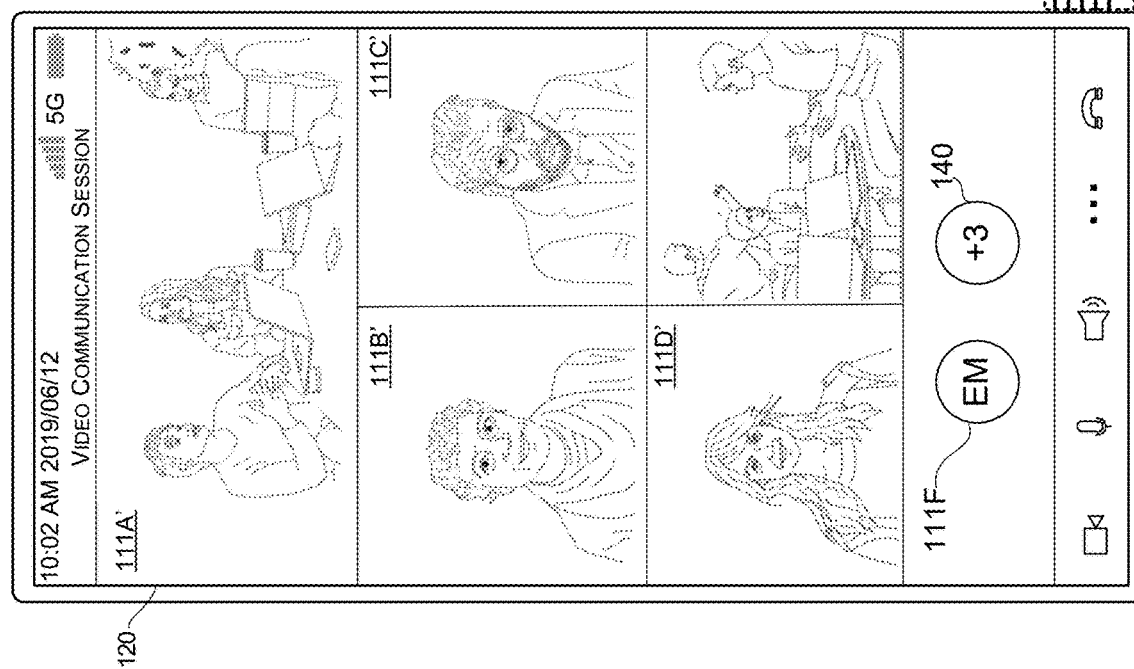

FIG. 2E
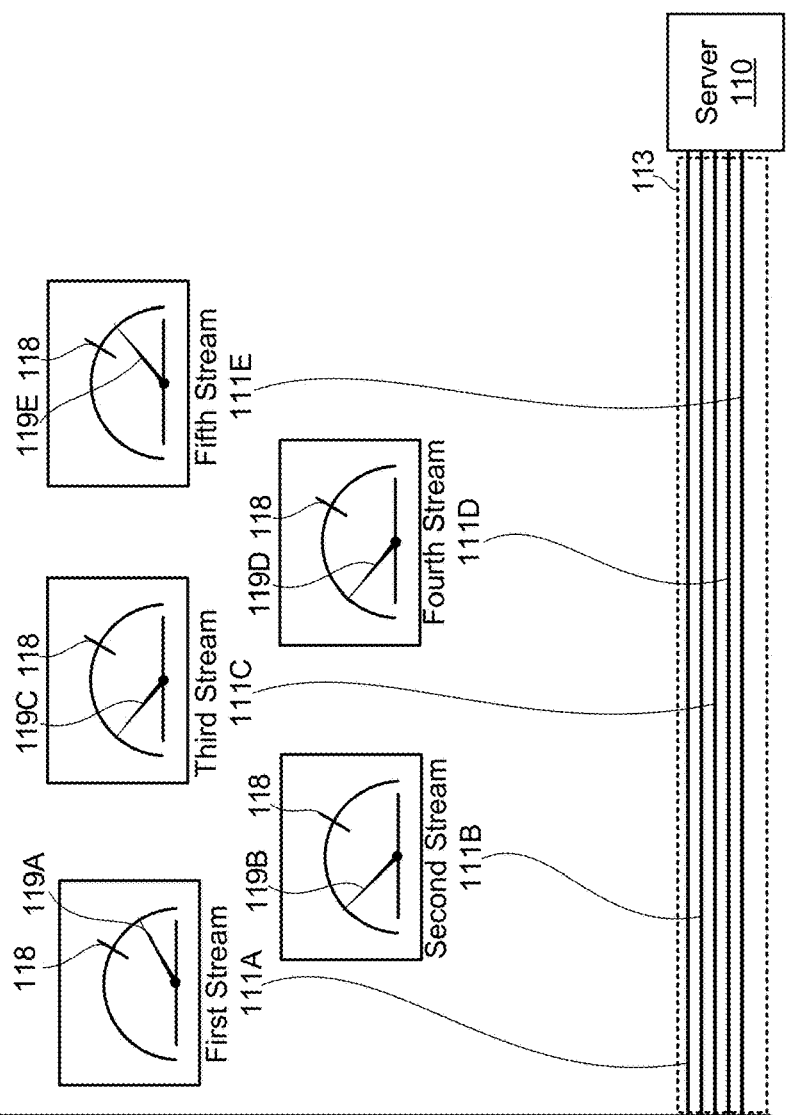
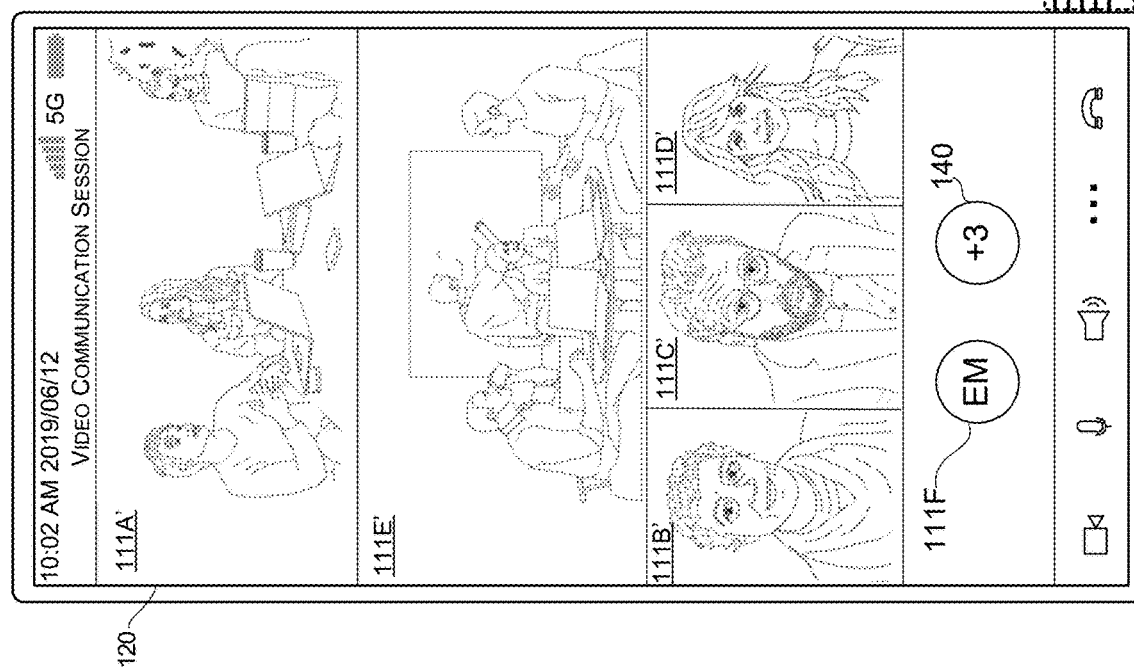

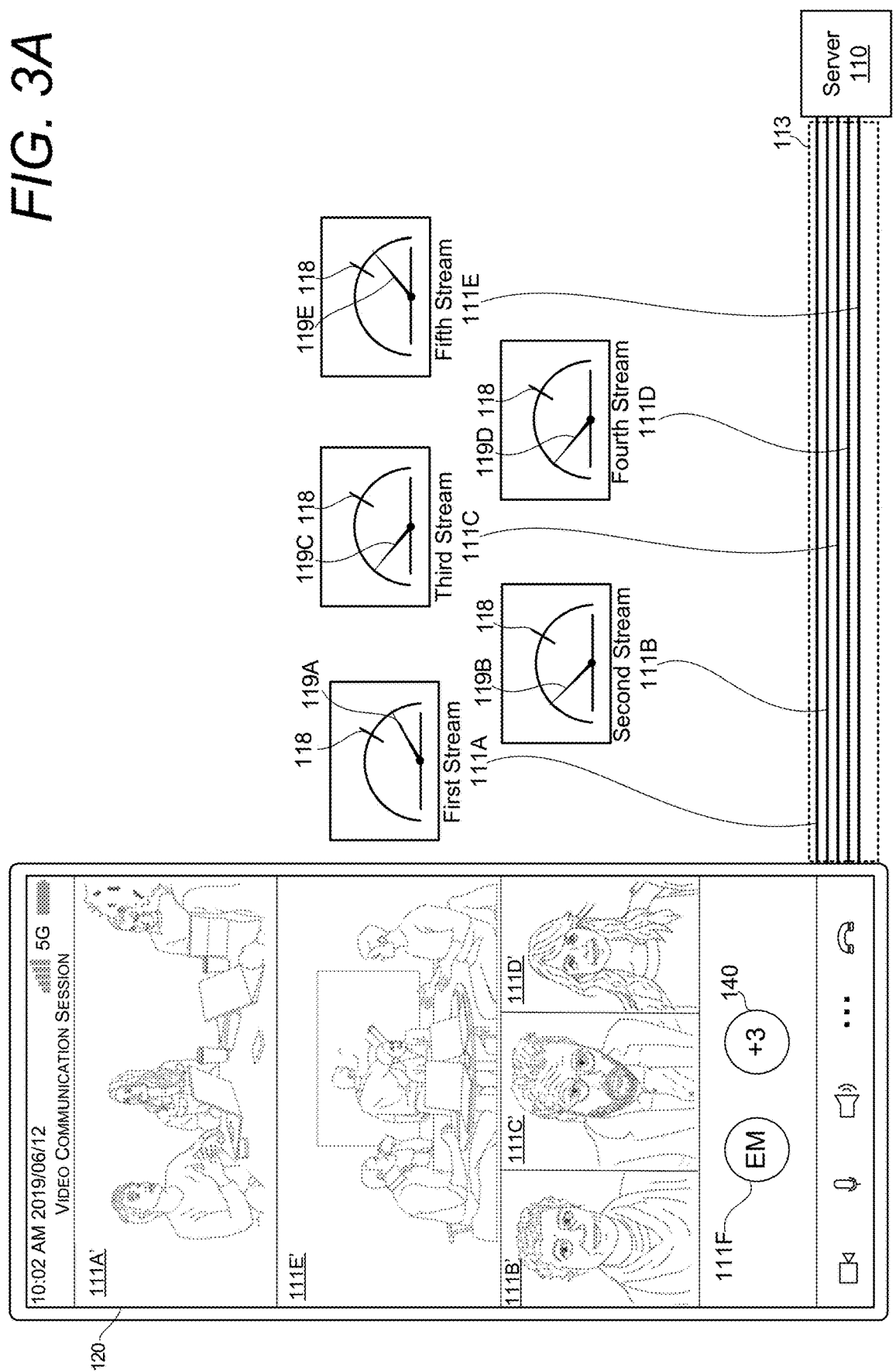

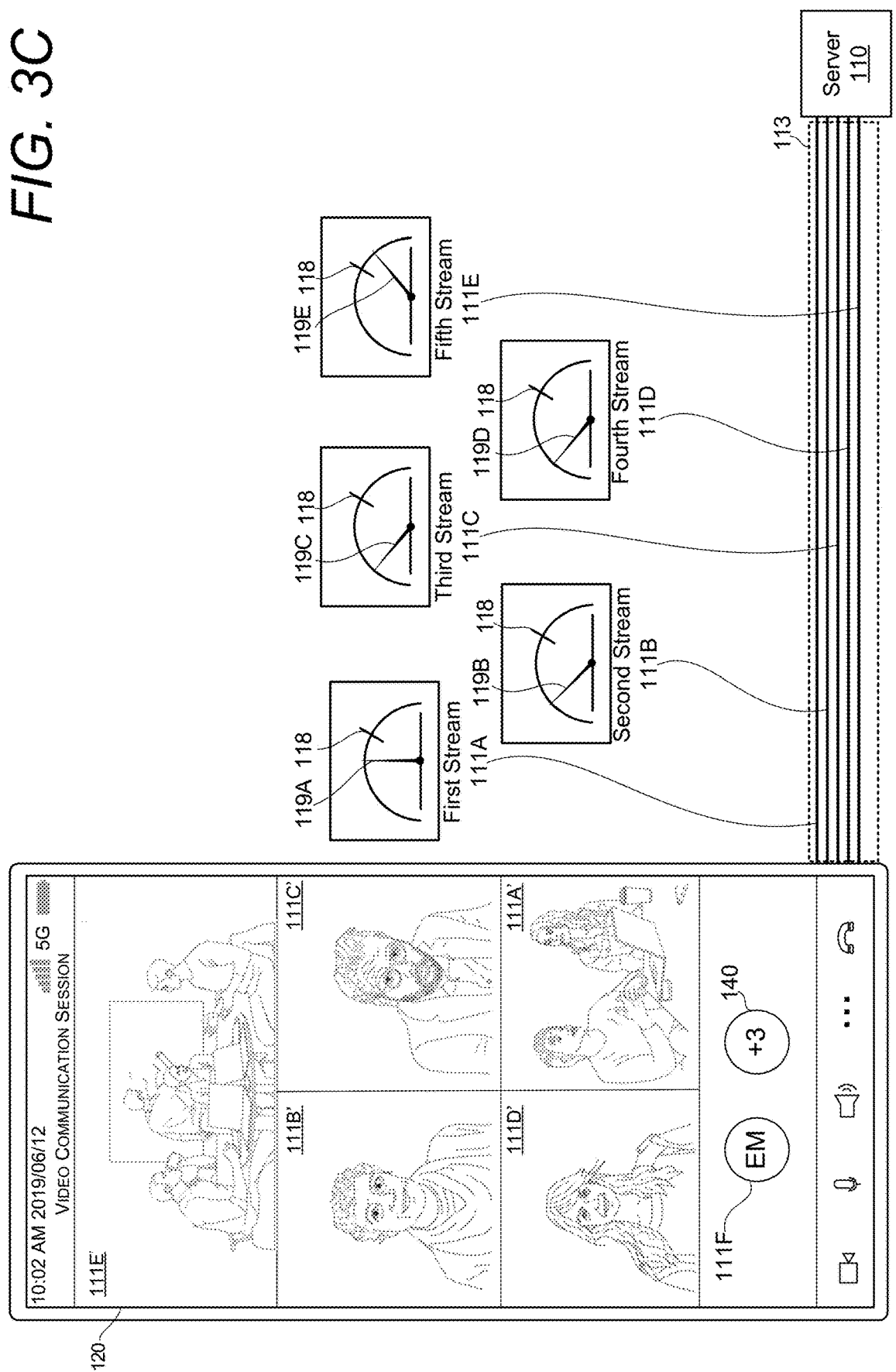

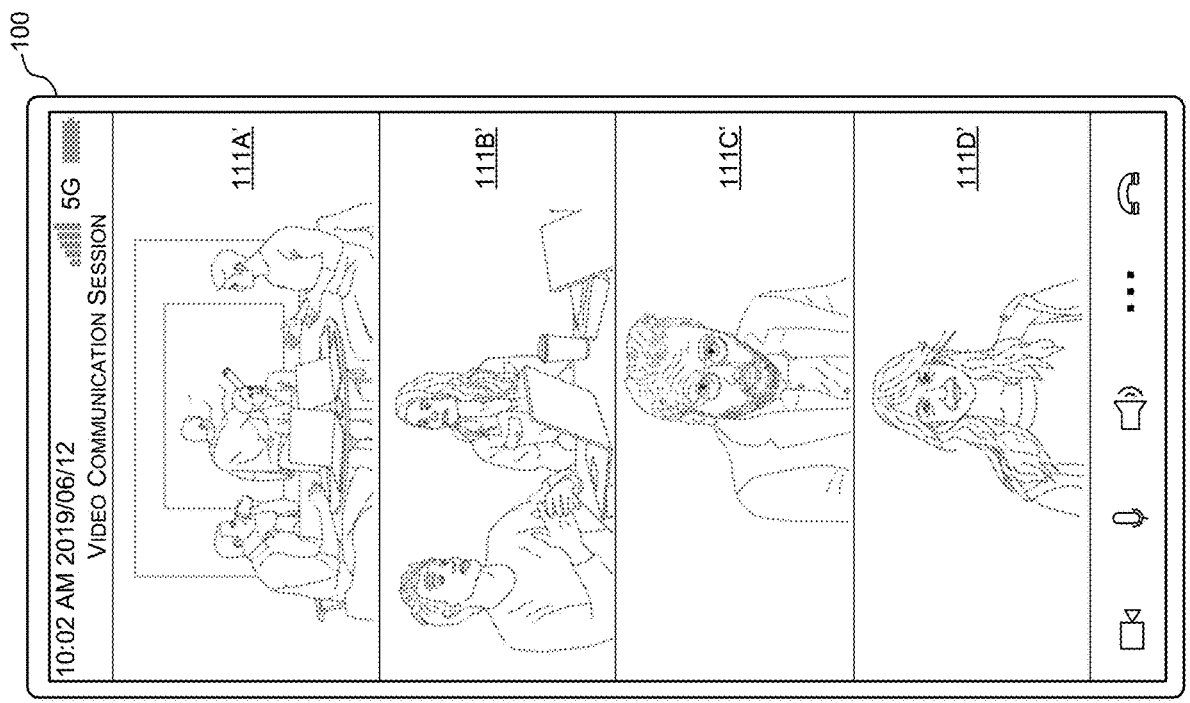

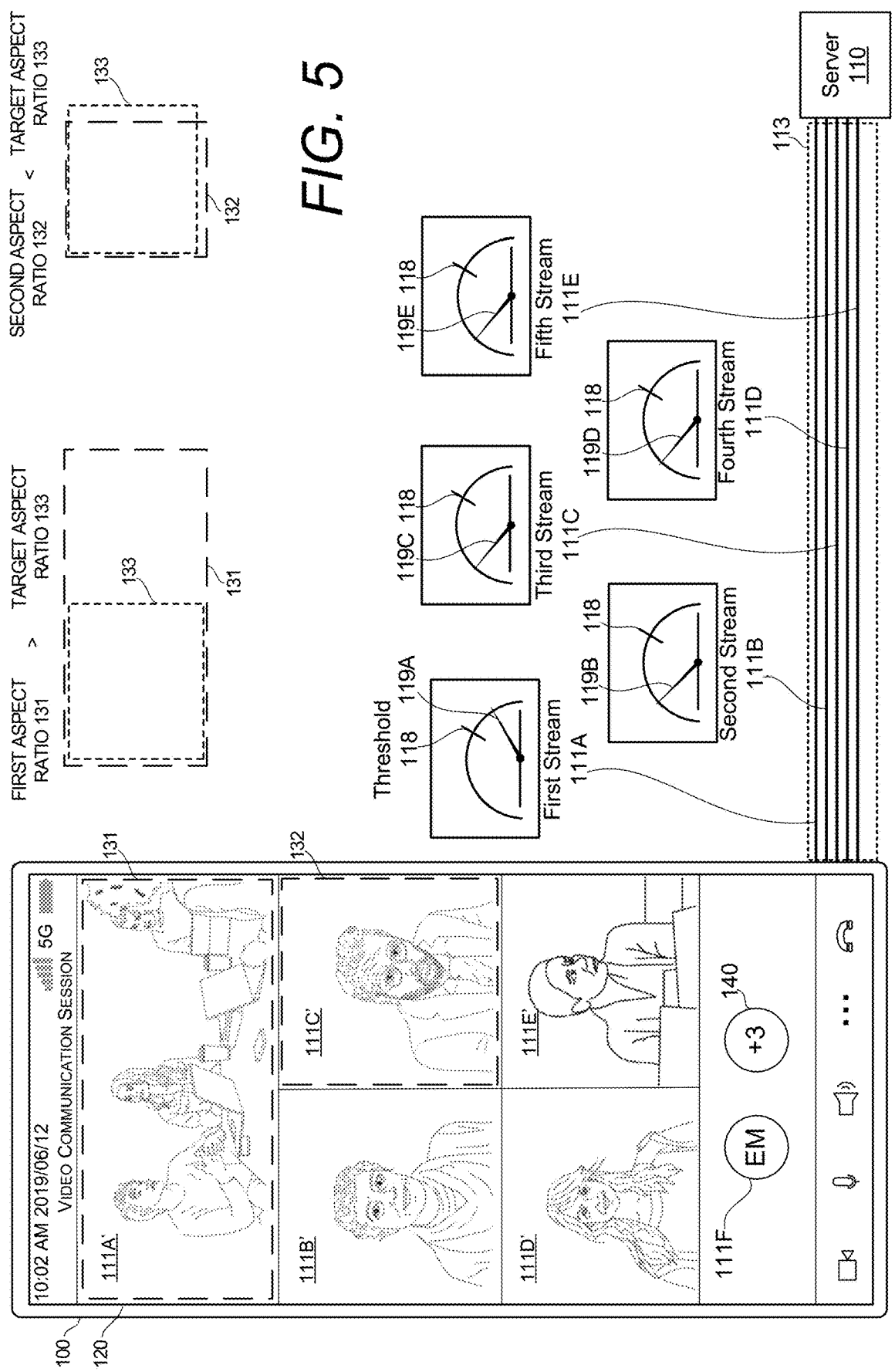

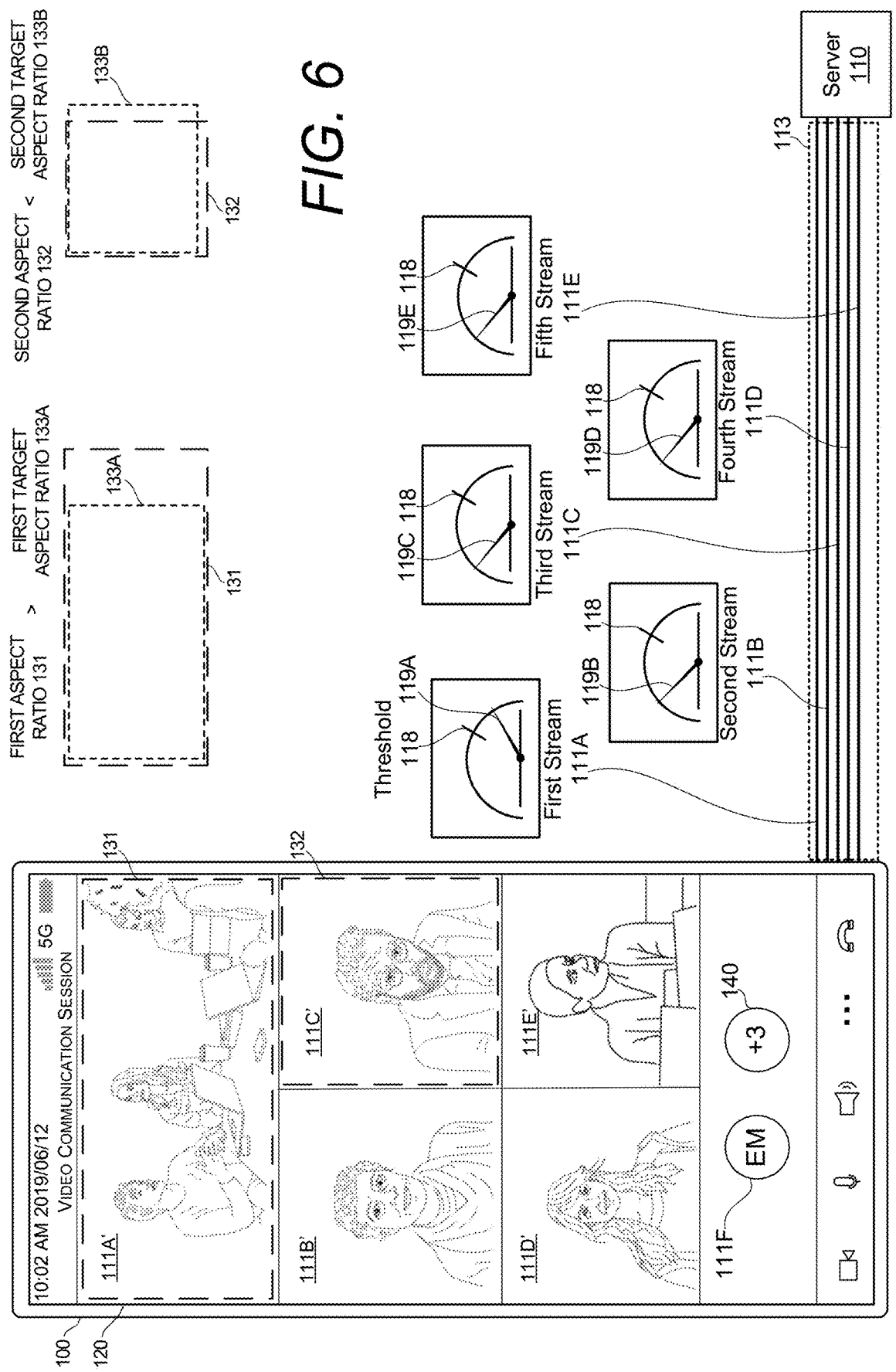

DYNAMICALLY CONTROLLED ASPECT RATIOS BASED ON A NUMBER OF PARTICIPANTS DEPICTED IN COMMUNICATION VIDEO STREAMS

BACKGROUND

There are a number of different communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Although there are a number of different types of systems that allow users to collaborate, such systems still have a number of shortcomings. For example, when an on-line meeting includes a number of video streams, e.g., some showing a single person and others showing a group of people, most existing systems display each stream in an arrangement that renders each stream having an equal size and shape. In such an arrangement, a rendering showing a group of people may not show the same level of detail for each person as a rendering showing a single person. Such user interface arrangements may not optimally promote user engagement since participants may not be able to clearly see important gestures performed by each person equally. Such issues can discourage user engagement reduce the efficacy of a communication session, particularly when some people may not be perceived as an equal to others merely because of a display arrangement.

Software applications that do not promote user engagement can lead to production loss and inefficiencies with respect to computing resources. For instance, participants of a communication session, such as an online meeting, may need to refer to recordings or other resources when content is missed or overlooked. Content may need to be re-sent or re-played when users miss salient points during a live meeting. Such activities can lead to inefficient use a network, processor, memory, or other computing resources. Also, when a participant's level of engagement is negatively impacted by a poor user interface arrangement, such a loss of production may cause a need for prolonged meetings or follow-up meetings, which in turn take additional computing resources. Such production loss and inefficiencies with respect to computing resources can be exacerbated when a system is used to provide a collaborative environment for a large number of participants.

In addition to a loss in user engagement, a number of other inefficiencies can result when communication systems do not effectively display a live video of a person. Participants can miss important social cues, e.g., when a person raises their hand, begins to speak, looks in a certain direction, etc. Such shortcomings sometimes require users to manually interact with a number of different systems. For example, some users still send text messages or emails to other participants while in a conference call if a cue was missed, etc. Such manual steps can be disruptive to a person's workflow and highly inefficient when it comes to helping a person establish a collaboration protocol with a group of people. Such drawbacks of existing systems can lead to loss of productivity as well as inefficient use of computing resources.

SUMMARY

The techniques disclosed herein improve user engagement and more efficient use of computing resources by providing dynamically controlled aspect ratios for communication session renderings based on a number of people depicted in shared video streams. In some configurations, a system can analyze a number of video streams to identify select streams depicting a threshold number of individuals. A first aspect ratio can be selected from a number of preset aspect ratios and the first aspect ratio can be used for the display of select streams depicting the threshold number of individuals. A second aspect ratio can be selected from the number of preset aspect ratios for displaying other streams depicting less than the threshold number of individuals. In some embodiments, the first aspect ratio is greater than the second aspect ratio. For instance, if a threshold is set at four people, a first video stream depicting four people may be displayed using aspect ratio of 16:9 and other video streams depicting less than the threshold number of people, e.g., one person, may be individually displayed at an aspect ratio of 4:3.

By switching among multiple preset aspect ratios depending on a number of individuals depicted in each video stream, the techniques disclosed herein can improve the presentation of communication session participants by uniquely shaping the display of different levels of multi-person videos and single-person video streams. This dynamic control over aspect ratios can improve user engagement in a communication session by improving the visibility of each person in select multi-person stream while also utilizing more compact formats for other streams. The techniques can also apply to a number of other objects depicted within a video stream, as the techniques are not just limited to identifying the number of people depicted in a video stream.

The examples described herein are provided within the context of collaborative environments, e.g., private chat sessions, multi-user editing sessions, group meetings, live broadcasts, etc. For illustrative purposes, it can be appreciated that a computer managing a collaborative environment involves any type of computer managing a communication session where two or more computers are sharing video data, both recorded and live video streams. In addition, it can be appreciated that the techniques disclosed herein can apply to any user interface arrangement that is used for displaying content. The scope of the present disclosure is not limited to embodiments associated with collaborative environments.

The techniques disclosed herein provide a number of features that improve existing computers. For instance, computing resources such as processor cycles, memory, network bandwidth, and power, are used more efficiently as a system can dynamically control the size, position, and shape of video streams depicting a threshold number of people. By providing dynamically controlled user interfaces that provide more visual details for objects of interest, the techniques disclosed herein can provide more efficient use of computing resources. The system can improve user interaction with a computing device by mitigating the need for additional communication systems, as the disclosed system can mitigate or eliminate the need for requests for content to be re-sent, repeated, etc. Improvement of user interactions with a device can also lead to the reduction of unnecessary or redundant inputs, which can mitigate inadvertent inputs, corrected inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 illustrates aspects of a communication system for configuring aspect ratios of individual renderings based on a number of people depicted in each video stream.

FIG. 2A illustrates aspects of a first stage of a process where a device can switch between preselected aspect ratios as a number of depicted users within a particular stream increases to a threshold.

FIG. 2B illustrates aspects of a second stage of a process where a device can switch between preselected aspect ratios, the second stage showing a particular stream maintaining fewer than a threshold number of people.

FIG. 2C illustrates aspects of a third stage of a process where a device can switch between preselected aspect ratios, the third stage showing a particular stream still maintaining fewer than a threshold number of people.

FIG. 2E illustrates aspects of a stage of a process where a device has switched between preselected aspect ratios in response to determining that a particular stream depicts a threshold number of people.

FIG. 3A illustrates aspects of a first stage of a process where a device can switch between preselected aspect ratios as a number of depicted users is reduced for a particular stream.

FIG. 3C illustrates aspects of a stage of a process where a device has switched between a first preselected aspect ratio to a second preselected aspect ratio in response to determining that a particular stream transitioned from a state of a stream depicting a threshold number of people to a state of the stream depicting less than the threshold number of people.

FIG. 4 illustrates aspects of a user interface where renderings of individual streams are ordered based on the number of people depicted in the streams.

FIG. 5 shows aspects of an embodiment where aspect ratios are selected based on a target aspect ratio.

FIG. 6 shows aspects of an embodiment where aspect ratios are selected based on a first target aspect ratio and a target aspect ratio.

DETAILED DESCRIPTION

Figure 2D:
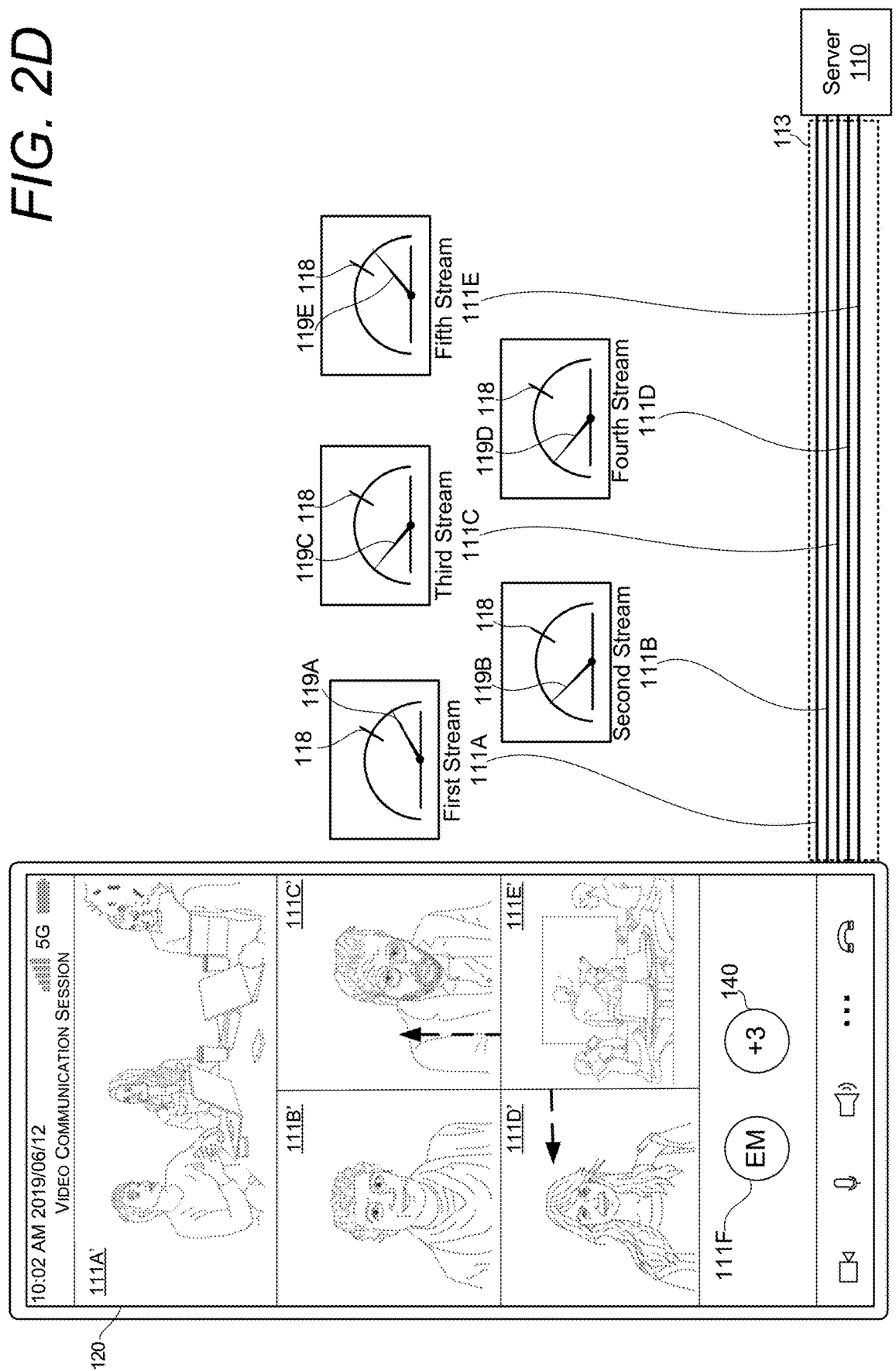
FIG. 2D illustrates aspects of a fourth stage of a process where a device can switch between preselected aspect ratios, the fourth stage showing a particular stream now depicting a threshold number of people.

The following Detailed Description is directed to techniques for improving user engagement and more efficient use of computing resources by providing dynamically controlled aspect ratios for renderings based on a number of individuals depicted in associated streams. FIG. 1 illustrates aspects of a system 100 for configuring a user interface arrangement based on a number of people depicted in each video stream. The system 100 can include a server 110 and at least one client device 101. The server 110 can manage a number of data streams having a video component and an audio component allowing the client device 101 to communicate with a number of other remote client devices. Additional aspects of the server 110 managing communication sessions between client computers are described in additional detail below with reference to the system 602 shown in FIG. 8. Additional aspects of the client device 101 are also described in more detail below with reference to the devices 606 shown in FIG. 8.

In some configurations, the server 110 or the client device 101 can analyze a number of streams 111 to identify select streams having a video component depicting at least a threshold 118 number of individuals 119A. In some configurations, the select streams, which in this example includes the first stream 111A, have a video component depicting a number of individuals 119A that meet or exceed a threshold 118. In some configurations, the threshold can be a predetermined number. For instance, a predetermined number can be three (3). Thus, when a stream has a video component that depicts at least three people, that video stream can be selected and distinguished from other streams using a particular set of preset aspect ratios. In this example, the first stream 111A is selected and a rendering 111A' of the first stream 111A is rendered using a first aspect ratio 131. The other streams that do not have a threshold number of people, such as the second stream 111B, have a rendering 111B' that is rendered using a second aspect ratio 132. Each of the streams that do not depict the threshold number of people, e.g., streams 111B-111E, can be rendered using the second aspect ratio 132.

In some embodiments, the first aspect ratio 131 is greater than the second aspect ratio 132. The first aspect ratio 131 can be a wide view, e.g., an aspect ratio greater than one, and the second aspect ratio 132 can be a narrow view, e.g., an aspect ratio less than one. The width of the aspect ratio can also be based on a number of people depicted in each stream. For instance, a first width, e.g., 16:9, can be selected for streams having greater than 5 people, or a second width, e.g., 4:3, can be selected for streams between 3 and 4 people. Thus, the first aspect ratio 131 can be selected from such options based on a number of people. The second aspect ratio 132 can be selected from another set of preset aspect ratios, e.g., 3:4 or 5:9, for streams depicting a number of people that do not meet a threshold, e.g., a threshold of three people.

A number of different technologies for determining a number of individuals depicted within a video component of a stream can be utilized. In one illustrative example, a suitable facial recognition technology can be utilized to identify individuals within a video component of a stream. In other examples, other technologies that identify predetermined shapes and/or various forms of movement can be utilized to determine the number of individuals depicted within a video component of a stream. Such recognition techniques may be utilized by any suitable computing device, such as the server 110, any client device 101, or a combination thereof. Once individuals are identified and counted, the system can generate metadata indicating a number of individuals depicted within a video stream. When generated at the server 110, the metadata, which can be included in session data 113, which may be communicated from the server 110 for controlling the client device 101. The client device 101 can utilize the metadata to determine an arrangement of a user interface and a position and size of each stream rendering within the user interface.

Thus, a method may include operations for analyzing the plurality of streams 111 to identify select streams 111A having at least one video component depicting at least a threshold 118 number of individuals 119A. The sever or the client device can then select a first aspect ratio 131 from a plurality of preset aspect ratios, the first aspect ratio reserved for the select streams 111A having one or more video components depicting at least the threshold 118 number of individuals 119A. The sever or the client device can then select a second aspect ratio 132 from the plurality of preset aspect ratios, the second aspect ratio reserved for other streams having one or more video components depicting less than the threshold 118 number of individuals 119B. The first aspect ratio 131 can be greater than the second aspect ratio 132.

The server can then cause a transmission of communication session data 113 and the plurality of streams 111 to a number of client computing devices 101. The communication session data 113 can then cause the number of client computing devices 101 to display a user interface 120 having a first set of individual renderings 111A' of the select streams 111A having video components depicting at least the threshold 118 number of individuals 119A. The first set of individual renderings displayed using the first aspect ratio that is selected using the number of depicted individuals. The user interface 120 can also include a second set of individual renderings 111B'-111E' of the other streams 111B-111E having the one or more video components depicting less than the threshold 118 number of individuals 119B-119E, the second set of individual renderings having a second aspect ratio 132 that is less than the first aspect ratio 131.

The metadata can identify a number of people depicted in a video and a description characterizing roles of people associated with the stream. The roles or other data indicating a priority for each individual can cause a computer to arrange the rendering of each stream based on a ranking or role of the individuals depicted in the streams. Metadata can also characterize certain streams, e.g., indicate that a number of people are audience members or presenters. Such metadata can be utilized to select a display region for different types of media content. For instance, although a video may have hundreds of people depicted in a video component, the video may not be selected for the first aspect ratio 131 because the people depicted in the video component are characterized as an audience and not as presenters.

Referring now to FIGS. 2A-2E aspects of a process for switching between preselected aspect ratios based on a number of depicted people within a particular stream is shown. In this example, a particular stream, e.g. the fifth stream 111E, increases the number of depicted individuals over time. The number of depicted individuals can change within a stream based on one or more factors. In one illustrative example, the source of the stream can modify a zoom level of a camera. Thus, a camera can zoom into a person or people of interest. In another illustrative example, the server managing stream or a device receiving the stream can crop a video component of a stream to bring focus to one or more objects of interest. A device can use a directional microphone or analyze a video component to identify movement or activity of a person or object. The device can then crop, and apply a scaling factor to, the video stream to bring focus to the person or object having a threshold level of activity. As outlined in the example described below, the device can adjust a crop level to bring focus to multiple people having a threshold level of activity. A device can also adjust a crop level to bring focus to particular people participating in a specific activity. For instance, if a person moves towards a designated object, such as a whiteboard, or starts to perform a specific task, such as drawing on a whiteboard or walking in a room, the device can adjust a crop level and/or apply a scaling factor to bring focus to such activity.

As shown in FIG. 2A, the server 120 communicates the session data 113 and one or more streams to a number of remote devices, including the client device 101. The communication session data 113 causes the client computing device to display a user interface 120 having a first set of individual renderings, including the first rendering 111A' of the select streams 111A having a video component depicting at least the threshold 118 number of individuals 119A. The first rendering is displayed using the first aspect ratio, which is reserved for renderings depicting at least a threshold number of people.

The user interface 120 also includes a second set of individual renderings 111B'-111E' of the other streams 111B-111E having the one or more video components depicting less than the threshold 118 number of individuals 119B-119E. The second set of individual renderings, which includes second rendering 111B' through the fifth rendering 111E', are each displayed using a second aspect ratio, which is reserved for renderings depicting less than a threshold number of people. The first aspect ratio, e.g., 16:9, is greater than the second aspect ratio, e.g., 1:1, 4:3 or 5:9. In some configurations, the first aspect ratio reserved for renderings depicting at least a threshold number of people can be any aspect ratio that indicates a wide view or a landscape view, and the second aspect ratio reserved for renderings depicting less than a threshold number of people can be any aspect ratio that is less than the first aspect ratio, e.g., an aspect ratio that indicates a narrow view or a portrait view.

As shown in FIG. 2B, to illustrate aspects of the present disclosure, the content of the fifth video stream 111E changes to include an image of two people. This change can be the result of an adjusted crop level at the device or by an adjusted zoom level or crop level at a source device capturing the video stream. As shown, the number of people depicted in the fifth stream 111E, at this state, is less than the threshold 118 number of individuals. As a result, the rendering 111E' of the fifth stream 111E remains at the second aspect ratio.

As shown in FIG. 2C, to illustrate aspects of the present disclosure, the content of the fifth video stream 111E changes to include an image of three people. As shown, the number of people depicted in the fifth stream 111E, at this state, is still less than the threshold 118 number of individuals. As a result, the rendering 111E' of the fifth stream 111E remains at the second aspect ratio.

As shown in FIG. 2D, to illustrate aspects of the present disclosure, the content of the fifth video stream 111E changes to include an image of four people. As shown, the number of people depicted in the fifth stream 111E, at this state, is greater than the threshold 118 number of individuals, e.g., meeting the condition that the stream depicts the threshold number of people. As a result, the device starts to transition the rendering 111E' of the fifth stream 111E from the second aspect ratio to the first aspect ratio.

FIG. 2E illustrates the resulting user interface 120 after the device has transitioned the rendering 111E' of the fifth stream 111E from the second aspect ratio to the first aspect ratio. As shown, the rendering 111E' of the fifth stream 111E is now displayed in a wider, landscape format, compared to the former state where the rendering 111E' of the fifth stream 111E was displayed using a narrower, portrait format.

Figure 3B:
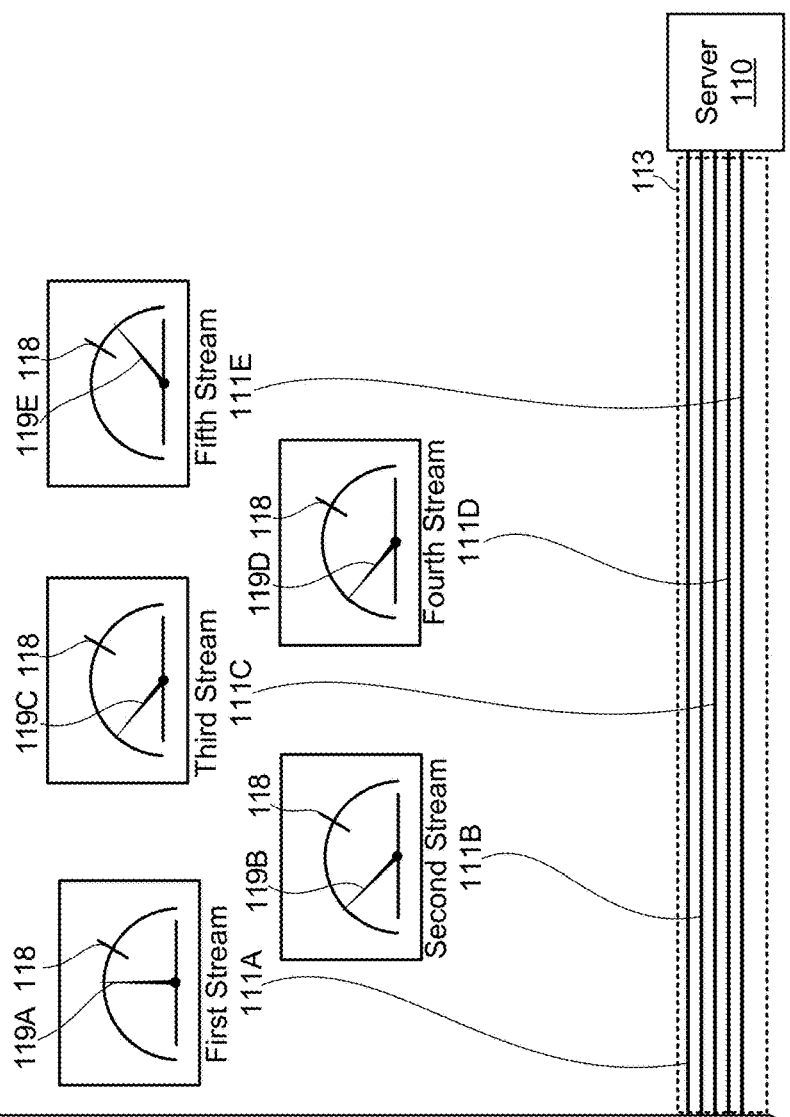
FIG. 3B illustrates aspects of a second stage of a process where a device can switch between preselected aspect ratios, the second stage showing a particular transitioning from a state of a stream depicting a threshold number of people to a state of the stream depicting less than the threshold number of people.

Referring now to FIGS. 3A-3C aspects of another process for switching between preselected aspect ratios based on a number of depicted people within a particular stream is shown. In this example, a particular stream, e.g. the first stream 111A, decreases the number of depicted individuals over time.

As shown in FIG. 3A, the server 120 communicates the session data 113 and one or more streams to a number of remote devices, including the client device 101. The communication session data 113 causes the client computing device to display a user interface 120 having a first set of individual renderings, including renderings 111A' and 111E' of the select streams 111A and 111E each having a video component depicting at least the threshold 118 number of individuals 119A and 119E. The first rendering 111A' and fifth rendering 111E' are displayed using the first aspect ratio, which is reserved for renderings depicting at least a threshold number of people. In this example, the threshold number of people is four.

The user interface 120 also includes a second set of individual renderings 111B'-111D' of the other streams 111B-111D having the one or more video components depicting less than the threshold 118 number of individuals 119B-119D. The second set of individual renderings, which includes second rendering 111B' through the fourth rendering 111D', are each displayed using a second aspect ratio, which is reserved for renderings depicting less than a threshold number of people. The first aspect ratio, e.g., 16:9, is greater than the second aspect ratio, e.g., 1:1, 4:3 or 5:9.

In some configurations, the first aspect ratio reserved for renderings depicting at least a threshold number of people can be any aspect ratio that indicates a wide view or a landscape view, and the second aspect ratio reserved for renderings depicting less than a threshold number of people can be any aspect ratio that is less than the first aspect ratio, e.g., an aspect ratio that indicates a narrow view or a portrait view.

As shown in FIG. 3B, to illustrate aspects of the present disclosure, the content of the first stream 111A changes to include an image depicting two people. As shown, the number of people depicted in the first stream 111A, at this state, is less than the threshold 118 number of individuals. As a result, the device starts to transition the rendering 111A' of the first stream 111A from the first aspect ratio to the second aspect ratio.

FIG. 3C illustrates a resulting user interface 120 after the device has transitioned the rendering 111A' of the first stream 111A from the first aspect ratio to the second aspect ratio. As shown, the rendering 111A' of the first stream 111A is now displayed in a narrower, portrait format, compared to the former state where the rendering 111A' of the first stream 111A was displayed using a wider, landscape format.

Referring now to FIG. 4, an embodiment where the renderings of individual streams are ordered based on the number of people depicted in the streams is shown and described below. In this embodiment, if a first stream depicts four people, a second stream depicts two people, and a third stream depicts one person, a device would configure a user interface arrangement ordering the streams from top to bottom as: the first stream, the second stream, and the third stream. Such an arrangement helps viewers stay focused on streams having a particular concentration of activity.

This example is provided for illustrative purposes and is not to be construed as limiting. Although the example described herein orders the renderings based on the number of people from top to bottom, it can be appreciated that the order can be arranged from bottom to top, left to right, right to left, or any other ordered configuration. It can also be appreciated that the order in which renderings are arranged can be based on other factors, such as a level of activity, e.g., a volume or rate in which a person is speaking or the performance of a particular gesture. In such an embodiment, and activity level may be generated for each stream, and the rendering of each stream may be ordered within a user interface arrangement 102 based on the activity level.

The techniques disclosed herein can utilize any suitable technology for analyzing a number of communication streams to determine a number of people depicted in one or more video components. For instance, facial recognition, pattern recognition, or movement recognition technologies can be utilized to determine a number of people depicted in the video components of each stream. Alternatively, a remote computer can analyze one or more streams to determine a number of people depicted in the video components of each stream and provide the number of depicted people in each stream by communicating the results to the device. The device can then configure the user interface to order individual renderings of each stream based on the number of people depicted in the video components of each stream. An order from a highest to a lowest number of participants can be arranged from left to right, right to left, top to bottom, bottom to top of a user interface. The order may also follow any other linear path defined within the user interface.

FIG. 5 illustrates another embodiment where the first aspect ratio 131 and a second aspect ratio 132 are selected based on a target aspect ratio 133. For the first aspect ratio 131, the device 101 can select any aspect ratio from a set of preset aspect ratios that are greater than the target aspect ratio 133. For example, the target aspect ratio can be 1:1 (value of one). In such an example, the first aspect ratio can be any aspect ratio greater than a value of one, e.g., a landscape dimension such as 16:9, 4:3, etc. As shown in the example of FIG. 5, with a given target aspect ratio of one, the aspect ratio of each rendering 111A' depicting a threshold number of people has an aspect ratio 131 that is greater than the target aspect ratio 133. In this example, the first aspect ratio 131 has a landscape dimension, e.g., 16:9.

For the second aspect ratio 132, the device 101 can select any aspect ratio from a set of preset aspect ratios that are less than the target aspect ratio 133. In the present example, the target aspect ratio can be 1:1 (value of one). In such an example, the first aspect ratio can be any aspect ratio greater than a value of one, e.g., a landscape dimension such as 16:9, 4:3, etc. As shown in the example of FIG. 5, with a given example target aspect ratio of one, each rendering depicting a threshold number of people can be displayed with an aspect ratio that is greater than the target aspect ratio 133. In this example, the first aspect ratio 131 has a landscape dimension, e.g., 16:9, which is greater than the given target aspect ratio 133. In continuing the current example of FIG. 5, with a given example target aspect ratio of one, each rendering depicting less than the threshold number of people can be displayed with an aspect ratio that is less than the target aspect ratio 133. In this example, the second aspect ratio 132 has a narrower configuration, which is less than or equal to the given target aspect ratio 133. Thus, in some embodiments, the second aspect ratio 132 can be less than or equal to the target aspect ratio 133.

The selection of the target aspect ratio can be based on one or more factors. For example, the target aspect ratio or the selected target ratios can be based on the dimensions of an allocated display area. An allocated display area may be a display area that is designated within one or more display screens. For instance, an allocated display area may be a specified display area spanning across multiple display devices or a specified display area comprising a portion of a single display device. An allocated display area can be defined by any configuration data and can include a set of coordinates within a display screen of a display device.

In one illustrative example, target aspect ratio or the selected aspect ratios can be selected based on one or more dimensions of a display device in communication with computing system. Thus, if a display screen has a 16:9 display area, the target aspect ratio or the selected aspect ratios can include values that are divisible by at least one dimension of the display screen. In one example where a display screen has a 16:9 configuration, the first aspect ratio for the example of FIG. 5 can be 9:4, and the second aspect ratio can be 4:9.

In another illustrative example, a target aspect ratio can be selected based on a preferred layout for the dimensions of a particular display device. In such embodiments, the device 101 can receive configuration data defining a target aspect ratio 133, which may be generated from a user input, a factory setting, or from machine learning data. For example, a user may set a target aspect ratio of one (1:1) if the user prefers to have landscape renderings for the first set of renderings having a threshold number of people, and portrait renderings for the second set of renderings having less than the threshold number of people. However, the target aspect ratio can be adjusted to a higher level, e.g., 4:3, if they wish to bias each selected aspect ratio to a wider configuration. Similarly, the target aspect ratio can be adjusted to a lower level, e.g., 3:4, if they wish to bias each selected aspect ratio to a narrower configuration.

In some configurations, a unique scaling factor can be applied to individual renderings of each stream. A scaling factor can be selected for each stream to equalize at least one dimension of a physical feature of two or more people depicted in different streams. One dimension can include a width and/or height of a person's face, head, crown or any other dimension that can be measured by an analysis of a video image of a person. For instance, consider a scenario where a first rendering depicts two people and a second rendering depicts one person. In this example, without the application of a scaling factor, the renderings show that the people in the two-person video appear to be smaller, e.g., half the size as the person in the single-person video. In an effort to equalize the size of the display of each person, a scaling factor can be selected to increase the size of the rendering, which may include cropping edges from the image, of the two-person video. In addition, or alternatively, another scaling factor can be selected to reduce the size of the rendering of the single-person video.

In some configurations, a scaling factor for each video can be selected based on the number of people depicted in each video. The selection of the scaling factors can be linear or non-linear. For instance, a two-person video may be scaled up by two times, and a three-person video can be scaled up by three times, etc. Alternatively, a two-person video may be scaled up by 1.75 times the size, and a three-person video can be scaled up by 2.15 times the size, etc. In another embodiment, a scaling factor for each video can be selected based on dimension of at least one physical feature of a depicted person. For instance, if one person in a two-person video has a measurement of 2 units of measure from the top of their head to their chin, and a person in a one-person video has a measurement of 4 units of measure from the top of their head to their chin, the two-person video may be scaled up by a factor of two. Other scaling factors may be selected based on the measurements depending on a desired outcome. By equalizing, or at least partially equalizing, at least one dimension of individual users depicted in each stream, the system can help improve user engagement by allowing viewers see details of displayed gestures and mitigating any visual favoritism that can result from people being displayed at different sizes.

FIG. 6 illustrates another embodiment where a first aspect ratio 131 and a second aspect ratio 132 are respectively based on a first target aspect ratio 133A and a second target aspect ratio 133B. The first target aspect ratio 133A and the second target aspect ratio 133B can be collectively referred to herein as a target aspect ratio range or a "range." The first target aspect ratio 133A can be referred to herein as a low end of the range and a second target aspect ratio 133B can be referred to herein as a high end of the range. For instance, a target aspect ratio range may include a range from 3:4 to 4:3. Thus, a device may select a first aspect ratio above the range and a second aspect ratio below the range. Such an embodiment enables a device to have more granular control over each user interface arrangement used in each orientation. The range can be selected based on a number of factors including, but not limited to, a user input, a preference file, machine learning data, etc. For illustrative purposes, aspect ratios are deemed to be greater or less than one another. Such comparisons can be based on each number of an aspect ratio to be respectively a numerator and a denominator of a fraction to derive a value. For example, an aspect ratio of 4:3 has a value of 1.33 which is greater than an aspect ratio of 1:1 having a value of 1.00.

Figure 7:
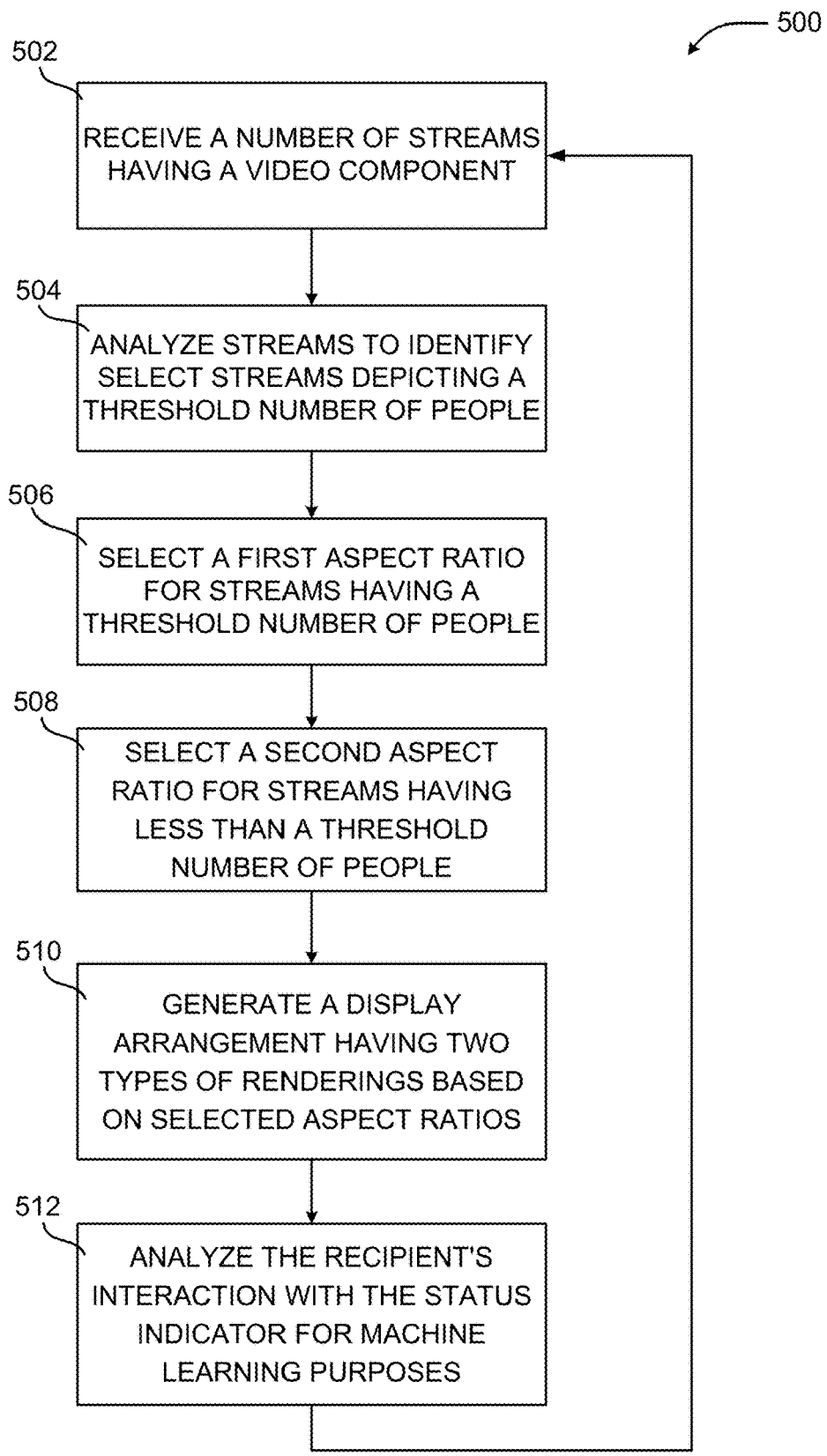
FIG. 7 is a flow diagram illustrating aspects of a routine for computationally efficient generation of a user interface having aspect ratios selected based on a number of people depicted in individual video streams.

FIG. 7 is a diagram illustrating aspects of a routine 500 for improving user engagement and more efficient use of computing resources by providing dynamically controlled view states for communication sessions based on a number of people depicted in video streams. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 500 starts at operation 502, where one or more computing modules receive a plurality of streams. As described in more detail below, a system can manage a number of streams received from a number of different client devices. The streams can be bundled and communicated to individual computing devices, which may be used to display different arrangements of each stream. Each stream may comprise an audio component and a video component.

Next, at operation 504, where one or more computing devices analyze one or more streams of a communication session to identify select streams depicting a threshold number of people. Operation 504 can utilize a number of different technologies for identifying people within an image or video images. Any suitable facial recognition technologies can be utilized to identify individuals. In addition, any suitable technology for identifying a person by a shape or a specific movement or gesture can be utilized.

People that are identified in a video component of a stream can be filtered from the count of the number of depicted people based on an activity they are engaged in. For instance, the system may only count individuals facing a camera capturing the video images, while individuals were not facing the camera are not counted for a comparison with a threshold. People that are talking may also be counted while other people who are not talking for a period of time are not counted. Different categories of gestures or movement can be identified and individuals who are in a predetermined category of gestures or movement can be counted and compared with a threshold.

The routine 500 proceeds to operation 506, where one or more computing devices select a first aspect ratio 131 from a plurality of preset aspect ratios. The first aspect ratio is selected and reserved for the select streams having one or more video components depicting at least the threshold 118 number of individuals, such as the first stream in the example of FIG. 1.

At operation 508, where one or more computing devices select a second aspect ratio 132 from the plurality of preset aspect ratios. The second aspect ratio is selected and reserved for the other select streams having one or more video components depicting less than the threshold number of individuals, such as the other streams 111B-111E in the example of FIG. 1.

At operation 510, one or more computers can generate data, such as communication session data 113, for causing one or more computing devices to generate a display arrangement having two different types of renderings based on selected aspect ratios. For instance, a server can cause the transmission of communication session data 113 and a plurality of streams 111 to a plurality of client computing devices 101, the communication session data 113 causing the plurality of client computing devices 101 to display a user interface 120 having a first set of individual renderings 111A' of the select streams 111A having video components depicting at least the threshold 118 number of individuals 119A. The first set of individual renderings can be displayed using the first aspect ratio that is selected using the number of depicted individuals. The user interface 120 can also include a second set of individual renderings 111B'-111E' of the other streams 111B-111E having the one or more video components depicting less than the threshold 118 number of individuals 119B-119E. The second set of individual renderings having a second aspect ratio 132 that is less than the first aspect ratio 131.

Next, at operation 512, one or more computing modules can analyze any user input used for adjusting an aspect ratio of a rendering. For instance, if a user adjusts the size of a particular rendering, the system can analyze the input and modify the target aspect ratio for future iterations of the routine 500. Thus, the target aspect ratio or a target aspect ratio range can be modified over time to optimize a user interface arrangement for a particular user or a group of users. The input data for configuring an aspect ratio of a rendering and any corresponding machine learning data can be stored on a per user and a per device basis. In addition, the input data for configuring an aspect ratio of a rendering and any corresponding machine learning data can be stored on a per event basis. Thus, a first target aspect ratio and a second target aspect ratio can be determined and stored in association with a device. Each iteration of the routine 500 can adjust a target aspect ratio for a device over time or switch between the use of a target aspect ratio or a target aspect ratio range device depending on a user's input patterns.

In one illustrative example, a device can start with a single target aspect ratio, e.g., a target aspect ratio of one (1:1). Then over time, if a user adjusts and aspect ratio, e.g., the user prefers to widen each of the renderings, the device may transition to a mode where it uses a target aspect ratio range, e.g., the device can use the original target aspect ratio as a low aspect ratio of a range and then generate a second target aspect ratio that is based on the user input for the device to select the second aspect ratio in future iterations. In some embodiments, if a user widens a particular aspect ratio of a rending depicting a threshold number of people, the device may match the high end of the target aspect ratio range to the aspect ratio resulting from the user input. If the user narrows a particular aspect ratio of a rending depicting less than a threshold number of people, the device may match the low end of the target aspect ratio range to the aspect ratio resulting from the user input. The device can then store the adjusted target aspect ratio or the target aspect ratio range causing subsequent executions of the routine 500 to provide a more customized display.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 8:
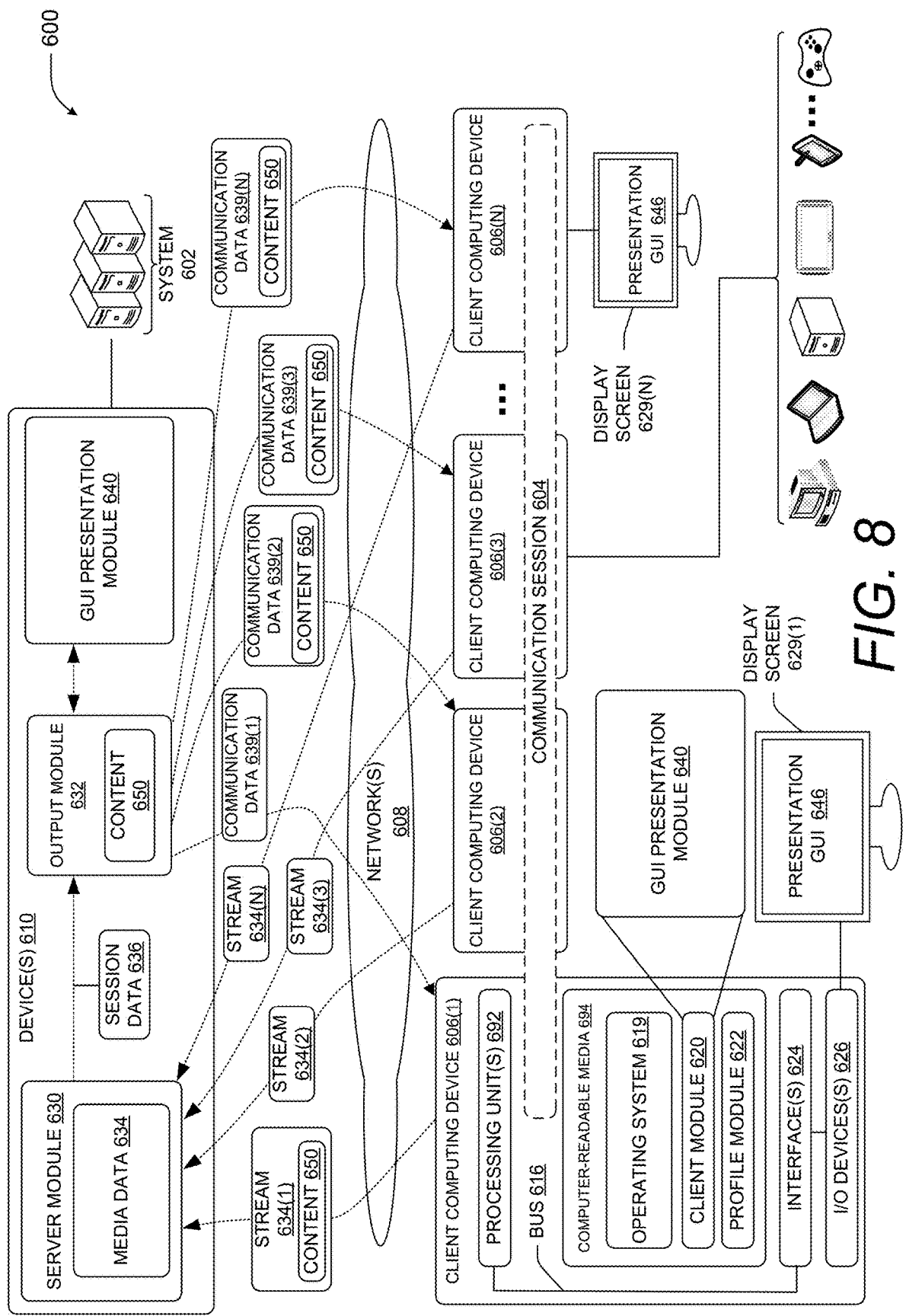
FIG. 8 is a computing system diagram showing aspects of an illustrative operating environment for the technologies disclosed herein.

FIG. 8 is a diagram illustrating an example environment 600 in which a system 602 can implement the techniques disclosed herein. In some implementations, a system 602 may function to collect, analyze, and share data defining one or more objects that are displayed to users of a communication session 604.

As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such a image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different than the general communication session.

Figure 9:
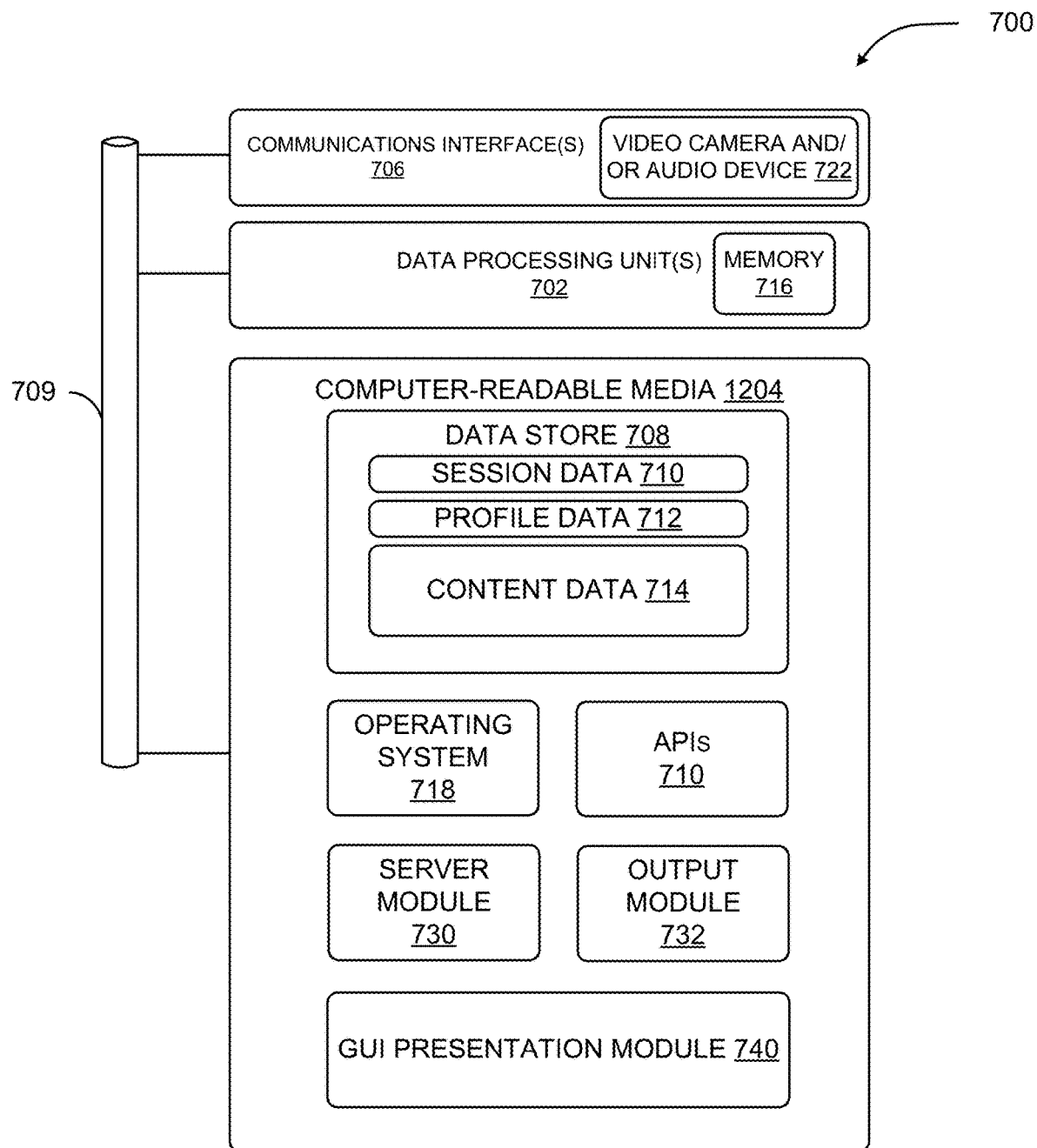
FIG. 9 is a computing architecture diagram showing aspects of the configuration and operation of a computing device that can implement aspects of the technologies disclosed herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 629.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

The disclosure presented herein also encompasses the subject matter set forth in the following clauses.

Clause A: A method performed by a computing system 110, the method comprising: receiving a plurality of streams 111, individual streams of the plurality of streams comprising a video component; analyzing the plurality of streams 111 to identify select streams 111A having at least one video component depicting at least a threshold 118 number of individuals 119A; selecting a first aspect ratio 131 from a plurality of preset aspect ratios, the first aspect ratio reserved for the select streams 111A having one or more video components depicting at least the threshold 118 number of individuals 119A; selecting a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; causing a transmission of communication session data 113 and the plurality of streams 111 to a plurality of client computing devices 101, the communication session data 113 causing the plurality of client computing devices 101 to display a user interface 120 having a first set of individual renderings 111A' of the select streams 111A having video components depicting at least the threshold 118 number of individuals 119A) the first set of individual renderings displayed using the first aspect ratio that is selected using the number of depicted individuals, and a second set of individual renderings 111B'-111E' of the other streams 111B-111E having the one or more video components depicting less than the threshold 118 number of individuals 119B-119E, the second set of individual renderings having a second aspect ratio 132 that is less than the first aspect ratio 131.

Clause B: The method of clause A, further comprising: analyzing the other streams 111B-111E having the one or more video components depicting less than the threshold 118 number of individuals 119B-119E to determine if one or more video components of the other streams 111B-111E starts to depict the threshold number of individuals; and in response to determining if one or more video components of the other streams 111B-111E starts to depict the threshold number of individuals, modify the communication session data 113 to cause the user interface 120 to transition the display of at least one of the other streams that started to depict the threshold number of individuals from the second aspect ratio to the first aspect ratio.

Clause C: The method of clauses A and B, further comprising: analyzing the select streams 111E having video components depicting at least the threshold 118 number of individuals 119E to determine if one or more video components of the select streams 111E starts to depict less than the threshold number of individuals; and in response to determining if one or more video components of the select streams 111E starts to depict less than the threshold number of individuals, modify the communication session data 113 to cause the user interface 120 to transition the display the select streams 111E that started to depict less than the threshold number of individuals from the first aspect ratio to the second aspect ratio.

Clause D: The method of Clauses A through C, further comprising: analyzing the plurality of streams to determine a number of people depicted in the video components of each stream; and configuring the user interface to order individual renderings of each stream based on the number of people depicted in the video components of each stream.

Clause E: The method of clauses A through D, wherein a target aspect ratio is selected based on one or more dimensions of a display device in communication with computing system, wherein the first aspect ratio is greater than the target aspect ratio and the second aspect ratio is less than the target aspect ratio.

Clause F: The method of clauses A through E, wherein the first aspect ratio is greater than a first target aspect ratio and the second aspect ratio is less than a second target aspect ratio.

Clause G: The method of clauses A through F, wherein the first target aspect ratio and the second target aspect ratio are selected based on one or more dimensions of a display device in communication with computing system.

Clause H: The method of clauses A through G, further comprising: receiving a user input to adjust the first aspect ratio; generating usage data defining an adjusted target aspect ratio that is based on the input used for adjusting the first aspect ratio, the adjusted target aspect ratio being greater than the target aspect ratio if the user input increases the first aspect ratio; and storing the adjusted target aspect ratio causing subsequent executions of the method to set the first aspect ratio to a value that is greater than or equal to the adjusted target aspect ratio.

Clause I: The method of clauses A through H, further comprising: receiving a user input to adjust the second aspect ratio; generating usage data defining an adjusted target aspect ratio that is based on the input for adjusting the second aspect ratio, the adjusted target aspect ratio being less than the target aspect ratio if the user input decreases the second aspect ratio; and storing the adjusted target aspect ratio causing subsequent executions of the method to set the second aspect ratio to a value that is less than or equal to the adjusted target aspect ratio.

Clause J: A system 101, comprising: one or more processing units 692; and a computer-readable medium 694 having encoded thereon computer-executable instructions to cause the one or more processing units 692 to: analyze a plurality of streams 111 to identify select streams 111A having at least one video component depicting at least a threshold 118 number of individuals 119A; select a first aspect ratio 131 from a plurality of preset aspect ratios, the first aspect ratio reserved for the select streams 111A having one or more video components depicting at least the threshold 118 number of individuals 119A; select a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; cause a display of a user interface 120 having a first set of individual renderings 111A' of the select streams 111A having video components depicting at least the threshold 118 number of individuals 119A, the first set of individual renderings displayed using the first aspect ratio that is selected using the number of depicted individuals, and a second set of individual renderings 111B'-111E' of the other streams 111B-111E having the one or more video components depicting less than the threshold 118 number of individuals 119B-119E, the second set of individual renderings having a second aspect ratio 132 that is less than the first aspect ratio 131.

Clause K: The system of clause J, wherein the instructions further cause the one or more processing units to: analyze the other streams 111B-111E having the one or more video components depicting less than the threshold 118 number of individuals 119B-119E to determine if one or more video components of the other streams 111B-111E starts to depict the threshold number of individuals; and in response to determining if one or more video components of the other streams 111B-111E starts to depict the threshold number of individuals, modify the user interface 120 to display at least one of the other streams depicting the threshold number of individuals using the first aspect ratio.

Clause L: The system of clauses J and K, wherein the instructions further cause the one or more processing units to: analyze the select streams 111E having video components depicting at least the threshold 118 number of individuals 119E to determine if one or more video components of the select streams 111E starts to depict less than the threshold number of individuals; and in response to determining if one or more video components of the select streams 111E starts to depict less than the threshold number of individuals, modify the communication session data 113 to cause the user interface 120 to display the select streams 111E that started to depict less than the threshold number of individuals using the second aspect ratio.

Clause M: The system of clauses J through L, wherein the instructions further cause the one or more processing units to: analyze the plurality of streams to determine a number of people depicted in the video components of each stream; and configure the user interface to order individual renderings of each stream based on the number of people depicted in the video components of each stream.

Clause N: The system of clauses J through M, wherein a target aspect ratio is selected based on one or more dimensions of a display device in communication with computing system, wherein the first aspect ratio is greater than the target aspect ratio and the second aspect ratio is less than the target aspect ratio.

Clause O: A system 110, comprising: means for receiving a plurality of streams 111, individual streams of the plurality of streams comprising a video component; means for analyzing the plurality of streams 111 to identify select streams 111A having at least one video component depicting at least a threshold 118 number of individuals 119A; means for selecting a first aspect ratio 131 from a plurality of preset aspect ratios, the first aspect ratio reserved for the select streams 111A having one or more video components depicting at least the threshold 118 number of individuals 119A; means for selecting a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; means for causing a display of a user interface 120 having a first set of individual renderings 111A' of the select streams 111A each being displayed using the first aspect ratio, and a second set of individual renderings 111B'-111E' of the other streams 111B-111E being displayed using a second aspect ratio 132 that is less than the first aspect ratio 131.

Clause P: The system of clause O, further comprising: means for analyzing the other streams 111B-111E having the one or more video components depicting less than the threshold 118 number of individuals 119B-119E to determine if one or more video components of the other streams 111B-111E starts to depict the threshold number of individuals; and means for modifying the communication session data 113 to cause the user interface 120 to transition the display of at least one of the other streams from the second aspect ratio to the first aspect ratio, the transition being in response to determining if one or more video components of the other streams 111B-111E starts to depict the threshold number of individuals Clause Q: The system of clauses O and P, further comprising: means for analyzing the select streams 111E having video components depicting at least the threshold 118 number of individuals 119E to determine if one or more video components of the select streams 111E starts to depict less than the threshold number of individuals; and means for modifying the communication session data 113 to cause the user interface 120 to display the select streams 111E to transition from the first aspect ratio to using the second aspect ratio, wherein the transition occurs in response to determining if one or more video components of the select streams 111E starts to depict less than the threshold number of individuals Clause R: The system of clauses O through Q, further comprising: means for analyzing the plurality of streams to determine a number of people depicted in the video components of each stream; and means for configuring the user interface to order individual renderings of each stream based on the number of people depicted in the video components of each stream.

Clause S: The system of clauses O through R, wherein a target aspect ratio is selected based on one or more dimensions of a display device in communication with computing system, wherein the first aspect ratio is greater than the target aspect ratio and the second aspect ratio is less than the target aspect ratio.

Clause T: The system of clauses O through S, wherein the first aspect ratio is greater than a first target aspect ratio and the second aspect ratio is less than a second target aspect ratio.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method performed by a computing system, the method comprising:

receiving a plurality of streams, individual streams of the plurality of streams comprising a video component;

analyzing the plurality of streams to identify select streams having at least one video component depicting at least a threshold number of individuals;

selecting a first aspect ratio from a plurality of preset aspect ratios, the first aspect ratio reserved for the select streams having one or more video components depicting at least the threshold number of individuals in each of the select streams;

selecting a second aspect ratio from the plurality of preset aspect ratios, the second aspect ratio reserved for other streams having one or more video components depicting less than the threshold number of individuals in each of the other streams, wherein the first aspect ratio is greater than the second aspect ratio;

causing a transmission of communication session data and the plurality of streams to a plurality of client computing devices, the communication session data causing the plurality of client computing devices to display a user interface having a first set of individual renderings of the select streams having video components depicting at least the threshold number of individuals in each of the individual renderings of the select streams, the first set of individual renderings displayed using the first aspect ratio that is selected using the number of depicted individuals, and a second set of individual renderings of the other streams having the one or more video components depicting less than the threshold number of individuals in each of the individual renderings of the other streams, the second set of individual renderings having a second aspect ratio that is less than the first aspect ratio.

2. The method of claim 1, further comprising:

analyzing the other streams having the one or more video components depicting less than the threshold number of individuals to determine if one or more video components of the other streams starts to depict the threshold number of individuals; and in response to determining if one or more video components of the other streams starts to depict the threshold number of individuals, modifying the communication session data to cause the user interface to transition the display of at least one of the other streams that started to depict the threshold number of individuals from the second aspect ratio to the first aspect ratio.

3. The method of claim 1, further comprising:

analyzing the select streams having video components depicting at least the threshold number of individuals to determine if one or more video components of the select streams starts to depict less than the threshold number of individuals; and in response to determining if one or more video components of the select streams starts to depict less than the threshold number of individuals, modifying the communication session data to cause the user interface to transition the display of the select streams that started to depict less than the threshold number of individuals from the first aspect ratio to the second aspect ratio.

4. The method of claim 1, further comprising:

analyzing the plurality of streams to determine a number of people depicted in the video components of each stream; and configuring the user interface to order individual renderings of each stream based on the number of people depicted in the video components of each stream.

5. The method of claim 1, wherein a target aspect ratio is selected based on one or more dimensions of a display device in communication with the computing system, wherein the first aspect ratio is greater than the target aspect ratio and the second aspect ratio is less than the target aspect ratio.

6. The method of claim 1, wherein the first aspect ratio is greater than a first target aspect ratio and the second aspect ratio is less than a second target aspect ratio.

7. The method of claim 6, wherein the first target aspect ratio and the second target aspect ratio are selected based on one or more dimensions of a display device in communication with the computing system.

8. The method of claim 1, further comprising:

receiving a user input to adjust the first aspect ratio;

generating usage data defining an adjusted target aspect ratio that is based on the input used for adjusting the first aspect ratio, the adjusted target aspect ratio being greater than the target aspect ratio if the user input increases the first aspect ratio; and storing the adjusted target aspect ratio causing subsequent executions of the method to set the first aspect ratio to a value that is greater than or equal to the adjusted target aspect ratio.

9. The method of claim 1, further comprising:

receiving a user input to adjust the second aspect ratio;

generating usage data defining an adjusted target aspect ratio that is based on the input for adjusting the second aspect ratio, the adjusted target aspect ratio being less than the target aspect ratio if the user input decreases the second aspect ratio; and storing the adjusted target aspect ratio causing subsequent executions of the method to set the second aspect ratio to a value that is less than or equal to the adjusted target aspect ratio.

10. A computing system, comprising:

one or more processing units; and a non-transitory computer-readable medium having encoded thereon computer-executable instructions to cause the one or more processing units to:

analyze a plurality of streams to identify select streams having at least one video component depicting at least a threshold number of individuals;

select a first aspect ratio from a plurality of preset aspect ratios, the first aspect ratio reserved for the select streams having one or more video components depicting at least the threshold number of individuals in each of the select streams;

select a second aspect ratio from the plurality of preset aspect ratios, the second aspect ratio reserved for other streams having one or more video components depicting less than the threshold number of individuals in each of the other streams, wherein the first aspect ratio is greater than the second aspect ratio;

cause a display of a user interface having a first set of individual renderings of the select streams having video components depicting at least the threshold number of individuals in each of the individual renderings of the select streams, the first set of individual renderings displayed using the first aspect ratio that is selected using the number of depicted individuals, and a second set of individual renderings of the other streams having the one or more video components depicting less than the threshold number of individuals in each of the individual renderings of the other streams, the second set of individual renderings having a second aspect ratio that is less than the first aspect ratio.

11. The system of claim 10, wherein the instructions further cause the one or more processing units to:

analyze the other streams having the one or more video components depicting less than the threshold number of individuals to determine if one or more video components of the other streams starts to depict the threshold number of individuals; and in response to determining if one or more video components of the other streams starts to depict the threshold number of individuals, modify the user interface to display at least one of the other streams depicting the threshold number of individuals using the first aspect ratio.

12. The system of claim 10, wherein the instructions further cause the one or more processing units to:

analyze the select streams having video components depicting at least the threshold number of individuals to determine if one or more video components of the select streams starts to depict less than the threshold number of individuals; and in response to determining if one or more video components of the select streams starts to depict less than the threshold number of individuals, modify the communication session data to cause the user interface to display the select streams that started to depict less than the threshold number of individuals using the second aspect ratio.

13. The system of claim 10, wherein the instructions further cause the one or more processing units to:

analyze the plurality of streams to determine a number of people depicted in the video components of each stream; and configure the user interface to order individual renderings of each stream based on the number of people depicted in the video components of each stream.

14. The system of claim 10, wherein a target aspect ratio is selected based on one or more dimensions of a display device in communication with the computing system, wherein the first aspect ratio is greater than the target aspect ratio and the second aspect ratio is less than the target aspect ratio.

15. A computing system, comprising:

means for receiving a plurality of streams, individual streams of the plurality of streams comprising a video component;

means for analyzing the plurality of streams to identify select streams having at least one video component depicting at least a threshold number of individuals;

means for selecting a first aspect ratio from a plurality of preset aspect ratios, the first aspect ratio reserved for the select streams having one or more video components depicting at least the threshold number of individuals in each of the select streams;

means for selecting a second aspect ratio from the plurality of preset aspect ratios, the second aspect ratio reserved for other streams having one or more video components depicting less than the threshold number of individuals in each of the other streams, wherein the first aspect ratio is greater than the second aspect ratio;

means for causing a display of a user interface having a first set of individual renderings of the select streams each being displayed using the first aspect ratio, and a second set of individual renderings of the other streams being displayed using a second aspect ratio that is less than the first aspect ratio.

16. The system of claim 15, further comprising:

means for analyzing the other streams having the one or more video components depicting less than the threshold number of individuals to determine if one or more video components of the other streams starts to depict the threshold number of individuals; and means for modifying the communication session data to cause the user interface to transition the display of at least one of the other streams from the second aspect ratio to the first aspect ratio, the transition being in response to determining if one or more video components of the other streams starts to depict the threshold number of individuals.

17. The system of claim 15, further comprising:

means for analyzing the select streams having video components depicting at least the threshold number of individuals to determine if one or more video components of the select streams starts to depict less than the threshold number of individuals; and means for modifying the communication session data to cause the user interface to display the select streams to transition from the first aspect ratio to using the second aspect ratio, wherein the transition occurs in response to determining if one or more video components of the select streams starts to depict less than the threshold number of individuals.

18. The system of claim 15, further comprising:

means for analyzing the plurality of streams to determine a number of people depicted in the video components of each stream; and means for configuring the user interface to order individual renderings of each stream based on the number of people depicted in the video components of each stream.

19. The system of claim 15, wherein a target aspect ratio is selected based on one or more dimensions of a display device in communication with the computing system, wherein the first aspect ratio is greater than the target aspect ratio and the second aspect ratio is less than the target aspect ratio.

20. The system of claim 15, wherein the first aspect ratio is greater than a first target aspect ratio and the second aspect ratio is less than a second target aspect ratio.

* * * * *